United States Patent
Meempat et al.

(10) Patent No.: US 11,419,007 B2
(45) Date of Patent: Aug. 16, 2022

(54) ADAPTIVE AUTOMATED LOAD BALANCING FOR MOBILITY NETWORKS INCLUDING FIFTH GENERATION NETWORKS AND BEYOND

(71) Applicants: AT&T INTELLECTUAL PROPERTY I, L.P., Atlanta, GA (US); AT&T Mobility II LLC, Atlanta, GA (US)

(72) Inventors: Gopalakrishnan Meempat, East Brunswick, NJ (US); Huahui Wang, Bridgewater, NJ (US); Slawomir Stawiarski, Carpentersville, IL (US); Senthil Raj Dhandapani, Weston, MA (US); Huijing Yang, Princeton, NJ (US); Dongho Kim, Livermore, CA (US); Kemal Kara, San Francisco, CA (US); Ravi Raina, Skillman, NJ (US); Weihua Ye, Chicago, IL (US); Hyun Ok Lee, San Ramon, CA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 17/106,440

(22) Filed: Nov. 30, 2020

(65) Prior Publication Data

US 2022/0174543 A1 Jun. 2, 2022

(51) Int. Cl.
*H04W 28/08* (2009.01)
*H04W 36/22* (2009.01)

(52) U.S. Cl.
CPC ... *H04W 28/0819* (2020.05); *H04W 28/0812* (2020.05); *H04W 36/22* (2013.01)

(58) Field of Classification Search
CPC ......... H04W 28/0819; H04W 28/0812; H04W 36/22
See application file for complete search history.

(56) References Cited

U.S. PATENT DOCUMENTS 10,064,099 B1 8/2018 Raina et al.
10,484,918 B2 11/2019 Wang et al.
(Continued)

OTHER PUBLICATIONS

Meempat, et al., "An Algorithmic Framework for Load Balancing Wireless Cells," AT&T Labs Jul. 14, 2017, 22 pages.

*Primary Examiner* — Kashif Siddiqui
(74) *Attorney, Agent, or Firm* — Amin, Turocy & Watson, LLP

(57) ABSTRACT

The disclosed technology is directed towards load balancing in an adaptive and automated way for wireless mobility networks to improve the overall harmonic-average UE throughput within each controlled group of cells (e.g., different frequency carriers serving a sector of a base station). A load balancer (e.g., analytics component) obtains various device traffic data including throughput data for cells of a group. Pairs of cells in a group (sharing a site and face) can be selected based on satisfying various criteria, with estimated throughput gain achieved by changing the handoff rates between the cell pairs. The technology iteratively repeats the overall process, driving a system to an optimal equilibrium.

20 Claims, 28 Drawing Sheets

(56) References Cited

U.S. PATENT DOCUMENTS

| | | | | |
|---|---|---|---|---|
| 2010/0273487 A1* | 10/2010 | Alonso-Rubio | .... | H04W 36/385 |
| | | | | 455/436 |
| 2012/0009972 A1* | 1/2012 | Viering | ........ | H04W 36/22 |
| | | | | 455/525 |
| 2015/0078344 A1* | 3/2015 | Futaki | ........ | H04W 36/0083 |
| | | | | 370/332 |
| 2018/0368037 A1* | 12/2018 | Wang | ........ | H04W 36/00837 |
| 2020/0275334 A1* | 8/2020 | Visuri | ........ | H04W 36/14 |

* cited by examiner

FIG. 19

1902 — Import the Concatenated Output from FIGS. 7 - 18, One Set for each Eligible Cell Pair; Exclude any Eligible Cell Pair for which no Output was Generated from FIG. 18

1904 — Sort Remaining Eligible Pairs by DL_MAC_thpt_face_gain_Mbps in Descending Order.

1906 — Select First Pair (after Sorting)

1908 — Is Num_pair_final > max_num_pairs_change ?
- yes

1910 — Is a Cell of Selected Pair already in list_proposal ?
- yes (skip this pair)
- no → to / from FIG. 20

1912 — Another Pair ?
- yes → 1914 Select Next Pair
- no → 1916 Return list_proposal → to FIG. 3 from FIG. 3

ADAPTIVE AUTOMATED LOAD BALANCING FOR MOBILITY NETWORKS INCLUDING FIFTH GENERATION NETWORKS AND BEYOND

TECHNICAL FIELD

The subject application relates to wireless communications systems in general, and more particularly to New Radio (NR) including fifth generation (5G) cellular wireless communications systems and/or other next generation networks.

BACKGROUND

In cellular communications systems, for a given geographical area, multiple frequency carriers (cells) typically serve the same area and traffic. Radio access network (RAN) resource distribution among the cells is determined according to cell selection/reselection criteria and resource allocation algorithms.

In general, these selection/reselection criteria and resource allocation algorithms are not designed with respect to overall user throughput in the coverage area. For example, it is common that some frequency carriers (cells) carry a lot more load than others serving the same geographical area, whereby the more loaded carriers tend to be poorly performing and cause a bottleneck, leading to poor overall user experience.

While some vendor-based solutions to balance traffic load are present, analyses based on current network measurements consistently show significant room for improvement. At the same time, the service provider has no direct access to the vendor's proprietary functions so as to be able to take corrective action. To attempt to alleviate imbalance across carriers, RAN optimization engineers typically examine the imbalance based on offline data collection and analysis and try to manually tune certain network settings based on experience, which can be often qualitative and need multiple trial and error iterations.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIGS. 19-23 comprise a flow diagram, (which can be coupled to FIG. 3), illustrating example operations for finalizing handover change proposals for an optimization group, in accordance with various aspects and embodiments of the subject disclosure.

DETAILED DESCRIPTION

Figure 1:
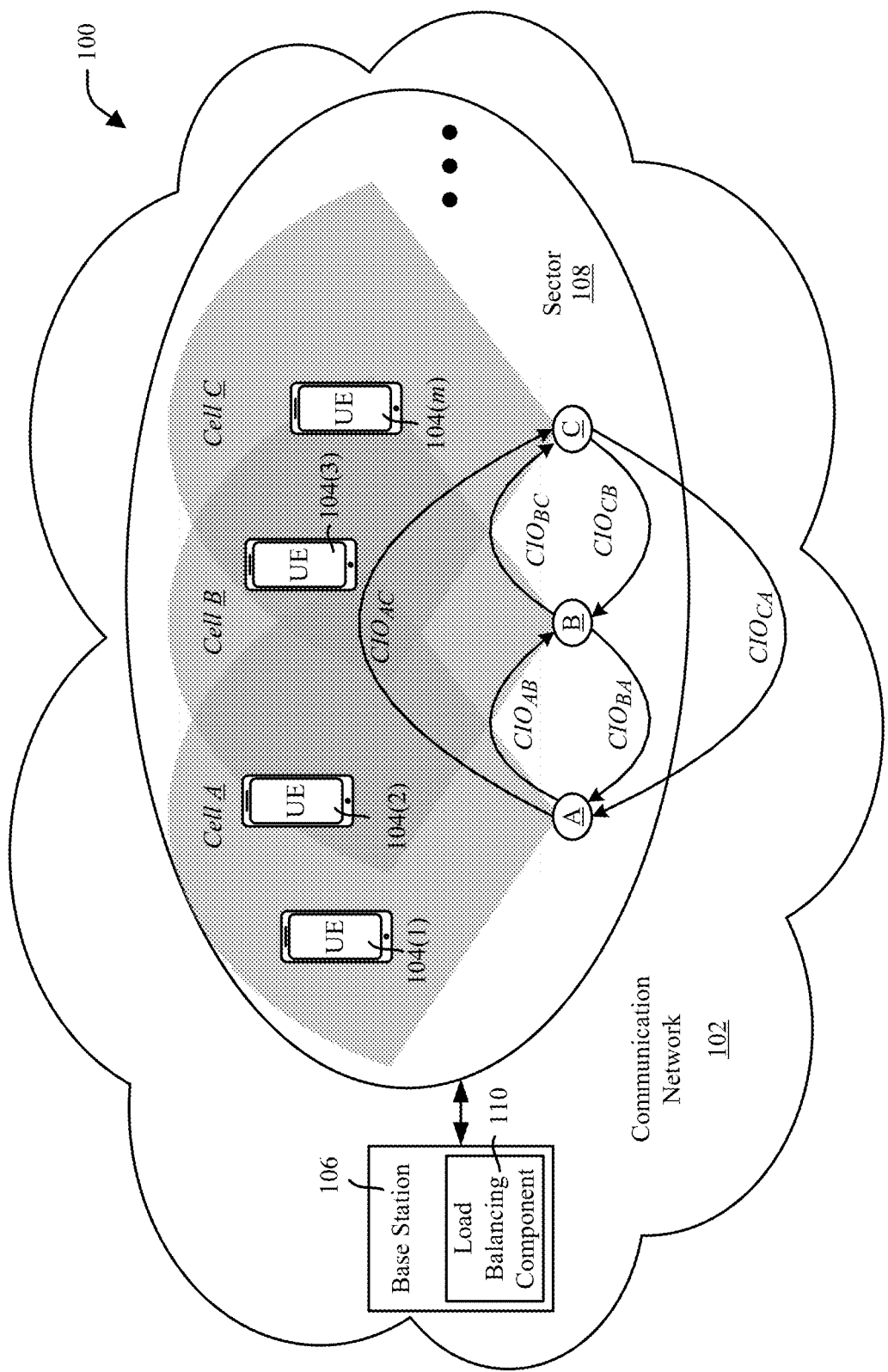
FIG. 1 illustrates a block diagram of an example system that can facilitate load balancing of traffic in a communication network, in accordance with various aspects and embodiments of the disclosed subject matter.

The technology described herein is generally directed towards automated load balancing within control contexts, each such control context comprised of a group of cells operating at different frequencies covering a geographical area (e.g., sectors/faces of an LTE/5G (or beyond) site). As will be understood, the load balancing operates to enhance (e.g., improve or even optimize) overall user equipment (UE) throughput by performing intra-face load balancing.

The load balancing can operate in an iterative fashion, with a configurable iteration interval that is typically in the range of several minutes to an hour to be able to adapt to the natural variability of traffic patterns in time. From traffic and resource measurement reports collected from the last update epoch, e.g., corresponding to the iteration interval, estimates are available for the carried volume, configured bandwidth and resource utilization of the cells in the group. This information can be applied as described herein, including to compute the current harmonic mean UE throughput, and further applied to estimate the results of traffic relocation across pairs of cells in the group. From the determined estimates, an ordered list of preferred candidate pairs is identified, and for the most promising cell pairs with respect to throughout improvement, traffic relocation is performed by increasing the handoff rate in one direction and/or decreasing the handoff rate in the reverse direction. This is facilitated by setting 3GPP (3rd Generation Partnership Project) standards-compliant parameters that determine the handoff rate offset or bias for each neighbor cell given a current serving cell, one parameter set for each directed pair of cells. The technology repeats the process iteratively, driving the system towards a more optimal equilibrium.

It should be noted that terms used herein, such as "optimize," "optimization," "optimal" and the like only represent objectives to move towards a more optimal state, rather than necessarily obtaining ideal results. For example, "optimizing" a network/system as used herein means moving towards a more optimal state, rather than necessarily achieving an optimal result. Similarly, "maximize" as used herein, such as to "maximize throughput" means moving towards a maximal state, not necessarily achieving such a state.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example block diagram of FIG. 1, a system 100 facilitates load balancing of traffic in a communication network 102, in accordance with various aspects and embodiments of the subject matter described herein. The system 100 can be coupled to a set of communication devices such as user equipment (UE) devices 104(1)-104(m), where m is any practical number.

The communication network 102 can comprise a set of base stations (e.g., access points (APs)), including a base station 106 that serves the UE) devices 104(1)-104(m), located in respective coverage areas such as cell A-cell C corresponding to locations in the communication network 102. For example, the base station 106 can be associated with one or more sectors, such as sector 108, which in this example includes cell A-cell C; as is understood, there can be additional cells in the sector 108. It should be noted that FIG. 1 is only for purposes of illustration, with cells A, B and C shown as pulled away only to bring out the logical relationships; in actual implementations, cells A, B and C do not necessarily cover geographically separated (or even partially overlapping) areas. Such cells (in an intra-same-sector context) are separated only by virtue of the distinct carrier frequencies at which they operate, and hence are essentially "invisible" to each other. For example, in a given sector, the cells in a load balanced group can be aiming at the same 120 degree region. The farthest reaches of these cells may indeed be asymmetric, because carrier signals at lower frequencies can travel farther than at higher frequencies. In a general embodiment (e.g., inter-site load balancing), in principle load balancing can be configured between cells attached to different towers covering partially overlapping geographical areas.

The respective cells exemplified as cell A-cell C can have respective characteristics, features, and/or capacities. For example, a first cell (e.g., cell A) of the sector 108 can have a first frequency band (e.g., 700 megahertz (MHz)) and a first capacity level, and a second cell (e.g., cell B) of the sector 108 can have a second frequency band (e.g., 1700 MHz, 1900 MHz, 2500 MHz, or other higher frequency) and a second capacity level, and so on. The capacity of a cell can depend on various factors, including, for example, the bandwidth of a cell, radio frequency (RF) conditions of user equipment devices 104(1)-104(m) in the network 102, proximity to a tower, the number of neighbor towers in the area, and/or another factor(s) that can cause interference in communications in the network 102. Typically, the higher the capacity of a cell, the better performance that communication devices therein can experience (e.g., faster communication rates or data downloads).

As described herein, the communication network 102 can include a load balancing component 110 that balances load of traffic associated with communication devices including UE devices 104(1)-104(m) among the cells of the communication network 102. In some embodiments, the load balancing component 110 can be part of the base station 106 such as shown in FIG. 1. In other embodiments, the load balancing component 110 can be separate from the base station 106 and can be associated with (e.g., communicatively connected to) the base station 106 and the sector 108.

As described herein, the load balancing component 110 can determine and balance device traffic throughput for cells (e.g., cell A-cell C) of the sector 108. As will be understood, the load balancing component can adaptively bias handover rates (e.g., one or more parameters, including handover bias parameters) associated with pairs of the cells, to thereby reduce the load on one cell of the pair and increase the load on another cell of the pair. This is generally represented by the curved arrows labeled $CIO_{AB}$ (cell individual offset from cell A to cell B) and $CIO_{BA}$ (from cell B to cell A), $CIO_{AC}$ (from cell A to cell C) and $CIO_{CA}$ (from cell C to cell A), $CIO_{BC}$ (from cell B to cell C) and $CIO_{CB}$ (from cell C to cell B). For example, increasing $CIO_{AB}$ encourages more handoffs from cell A to cell B, which can be done in conjunction with decreasing $CIO_{BA}$ in the reverse direction. The selection of cell pairs and the direction/amounts to bias the handoffs between them in a desirable way with respect to load balancing is determined as generally described herein.

Figure 2:
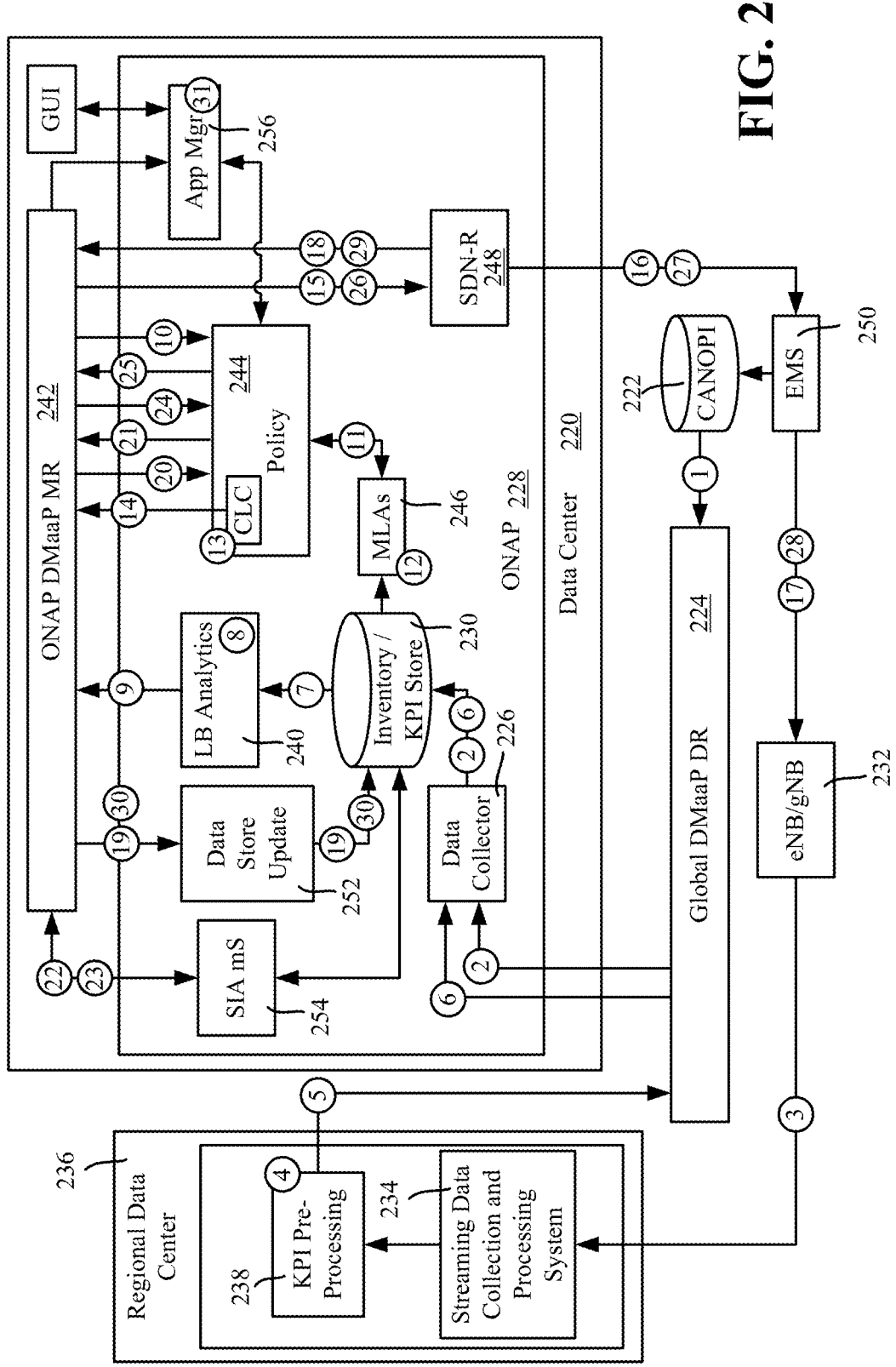
FIG. 2 depicts a block diagram of an example embodiment of architecture to perform load balancing between cell pairs based on various data as described herein, in accordance with various aspects and embodiments of the disclosed subject matter.

FIG. 2 shows an embodiment of architecture including a data center 220 to deploy the technology described herein. In one aspect, as represented by labeled arrow (1), a CANOPI (converged AT&T network operations provisioning and inventory) component 222 publishes eNodeB inventory/configuration data to global DMaaP (data movement as a platform) data router 224.

At labeled arrow (2), a data collector 226 in DCAE (data collection, analytics, and events) generation for ONAP 228 (orchestration, management, and automation platform) reads the inventory/configuration data from the global DMaaP data router 224 and writes the data to an inventory data store 230. Note that arrows (1) and (2) represent non-real time data flow.

At labeled arrow (3), which represents real time data, an eNodeB/gNodeB 232 sends cell trace data to a streaming data collection and processing system 234 in regional data center 236; as represented by circled numeral (4), the regional data center 236 performs some KPI pre-processing (KPI pre-processing module 238), including to compute real-time key performance indicators (KPIs) and aggregated KPIs based on the real-time cell trace data.

At labeled arrow (5), the regional data center 236 publishes the calculated KPIs (e.g., in a file format with some delay such as five minutes) to the global DMaaP data router 224. At labeled arrow (6), the data collector 226 reads the calculated KPIs and writes them to the KPI data store 230.

At labeled arrow (7), use case load balancing (LB) analytics module 240 in DCAE for ONAP 228 reads cell inventory data and the calculated KPIs from the inventory/KPI store 230.

As represented by circled numeral (8), depending on the use cases, the load balancing analytics module 240 can evaluate the cells' performance data and find/list problematic cells, or can perform machine learning based on the cell inventory data and the calculated KPIs, which may recommend parameter changes at eNodeBs/cells.

At labeled arrow (9), use case load balancing analytics module 240 publishes the list of problematic cells or eNodeB/cell parameter change recommendations to ONAP DMaaP message router 242. Note that arrows labeled (9) and above represent control messages.

At labeled arrow (10), a policy component 244 reads the messages from the ONAP DMaaP message router 242. For the use cases with the problematic cell list in the DMaaP messages, the policy component 244, in some optional implementations, can invoke one or more machine learning algorithm (MLAs) 246 for the problematic cells on the list (arrow (11), not for load balancing); at circled numeral (12). Such machine learning algorithms 246 may recommend parameter changes at the cells based on cell data from the inventory/KPI store 230, and send the results (which may include the recommended changes) back to the policy component 244.

As represented by circled numeral (13), the policy component 244 performs rule checking, including individual use case rules and use case coordination rules (in CLC), on the recommended changes. At labeled arrow (14), the policy component 244 publishes the eNodeB parameter change actions to ONAP DMaaP message router 242, if the rule checking is successful At arrows (15) and (16), SDN-R 248 (a software defined network controller for 'Radio') 248 reads the eNodeB parameter change action from ONAP DMaaP message router 242, and SDN-R 248 forwards the parameter change action to EMS (element management system) 250.

At labeled arrow (17), EMS 250 implements the configuration parameter changes at the eNodeB/gNodeB 232.

At labeled arrow (18), SDN-R 248 publishes the parameter change response to ONAP DMaaP message router 242.

At labeled arrow (19), a data-store-update component 252 reads the parameter change response message from the ONAP DMaaP message router 242, and if it is a successful response, the data-store-update component 252 updates the configuration parameter values in the inventory store 230.

At arrow (20), the policy component 244 also reads the parameter change response message from ONAP DMaaP message route 242, and if it is a successful response, at arrow (21) the policy component 244 publishes an evaluation task message to the ONAP DMaaP message router 242 to trigger an evaluation process.

At arrow (22), SIA mS reads the evaluation task message from ONAP DMaaP message router 242 and conducts the network performance evaluation based on the relevant KPI values in the KPI store 230. At arrow (23), SIA mS 254 publishes the evaluation result to the ONAP DMaaP message router 242.

From there, at arrow (24), the policy component 244 reads the evaluation results from the ONAP DMaaP message router 242. Based on the evaluation results, the policy component 244 determines whether or not to revert the eNB parameter change corresponding to the previous steps. If the policy component 244 determines to revert, at arrow (25) the policy component 244 publishes a configuration change action to ONAP DMaaP message router 242, which leads to reverting the previous configuration parameter changes.

By way of example, at the optimization intervals, the following can be checked for protection purposes, and if not met, revert back to previous setting:

For each site-face (where configuration parameters are in boldface):

retainability (N=n)>eval_min_ret_abs_pct (e.g., 98%) AND retainability (N=n)>retainability (N=n−1)−eval_max_ret_decr_abs_pct (e.g., 0.5%).

Further, for a unique site identifier and face (USID-face), if the number of net revert-back actions is greater than max_num_revert_back (e.g., 3) within a specified period of time, then the USID-face is black-listed and not optimized for a specified period of time.

At arrows (26) and (27) SDN-R 248 reads the parameter action from ONAP DMaaP message router 242, and SDN-R 248 forwards the parameter action to EMS 250. At arrow (28) EMS 250 implements the configuration parameter action to eNodeB/gNodeB 232.

As represented by arrow (29), SDN-R 248 publishes the parameter change response to ONAP DMaaP message router 242.

As represented by arrow (30), the data-store-update component reads the successful parameter change response to ONAP DMaaP message router 242 and updates the configuration parameter values in the inventory store 230.

Further, as represented by circled numeral (31), an application (app) manager/monitor 256 can read the message events in the ONAP DMaaP message router 242, generate statistics and present the statistics (e.g., via a graphical user interface/GUI) to a user.

Figure 3:
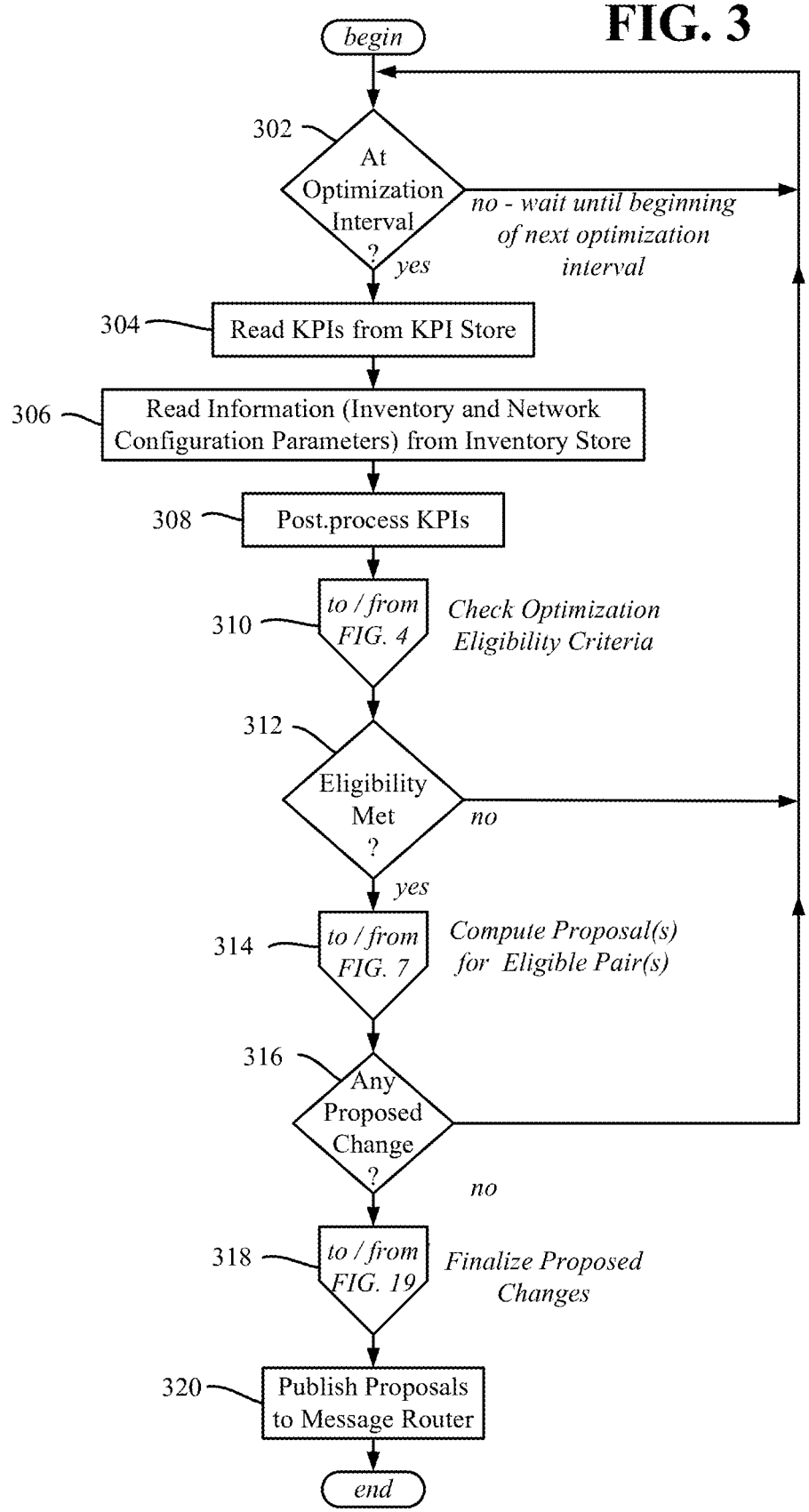
FIG. 3 is a flow diagram representing operations to move a site's cells to a more optimized state with respect to balanced traffic load, in accordance with various aspects and embodiments of the subject disclosure.

Turning to FIG. 3 and optimization operations, the optimization is performed for optimization groups, in which each optimization group includes cells that share the same value of the combination {USID-face}, (where USID is a unique site identifier that corresponds to a unique site location). There can be one or more eNodeBs at a given site location, sharing the same USID. A face corresponds to a portion of the geographical area covered by a given site. Generally, there are three faces for a site, which can be denoted as A, B, and C, and each face roughly covers one-third of a site's coverage. Note however that there can be exceptions, e.g., with DAS (distributed antenna systems) sites, a face does not necessarily correspond to a one-third of the site coverage.

FIG. 3 is a flow diagram showing an overall flow of example operations to perform the load balancing enhancement/optimization and compute proposed changes. Note that operations 310 through 318 are performed independently for each optimization group, that is, for each combination of a {USID-face}.

Operation 302 represents waiting for a next optimization interval; for example, the operations can be performed periodically, and the interval, which is user-configurable, is determined by an application parameter opt_interval_minutes (user-configurable, integer, default=60, min=5, max=60). The value of this parameter can be accessed through the interface. If the optimization interval falls within exclusion hours (specified by hours_to_exclude), then, the optimization interval is skipped.

Once optimization starts, operation 304 read the KPIs, that is, the load balancing analytics module 240 (FIG. 2) reads the KPIs from the KPI store 230, such as via suitable API calls or the like. Operation 306 reads the inventory and network configuration parameters.

In one or more implementations, the list of information elements that need to be read from the inventory store can be grouped into groups of information elements, including one group of information elements for the network configuration parameters that the analytics module 240 optimizes, and the other for the attributes of the network element. The first group of information elements is read at the beginning of each optimization interval; this is because some of these parameters are subject to optimization by other applications and thus the analytics module needs to know the latest values before it proposes new changes. The second group of information elements can be read periodically or the like, such as daily.

Operation 308 represents post-processing of the KPIs. Note that the received KPIs are further processed before running the optimization because the KPIs published by the KPI pre-processing module 238 and stored in the KPI store 230 may not be in the format that the load balancing application analytics module 240 needs and/or the granularity of the received KPIs may be different from the optimization interval specified by the load balancing application. Further note that in one or more implementations, each set of KPIs is generated based on the data generated between the beginning of the previous optimization interval and the beginning of the current optimization interval.

Figure 4:
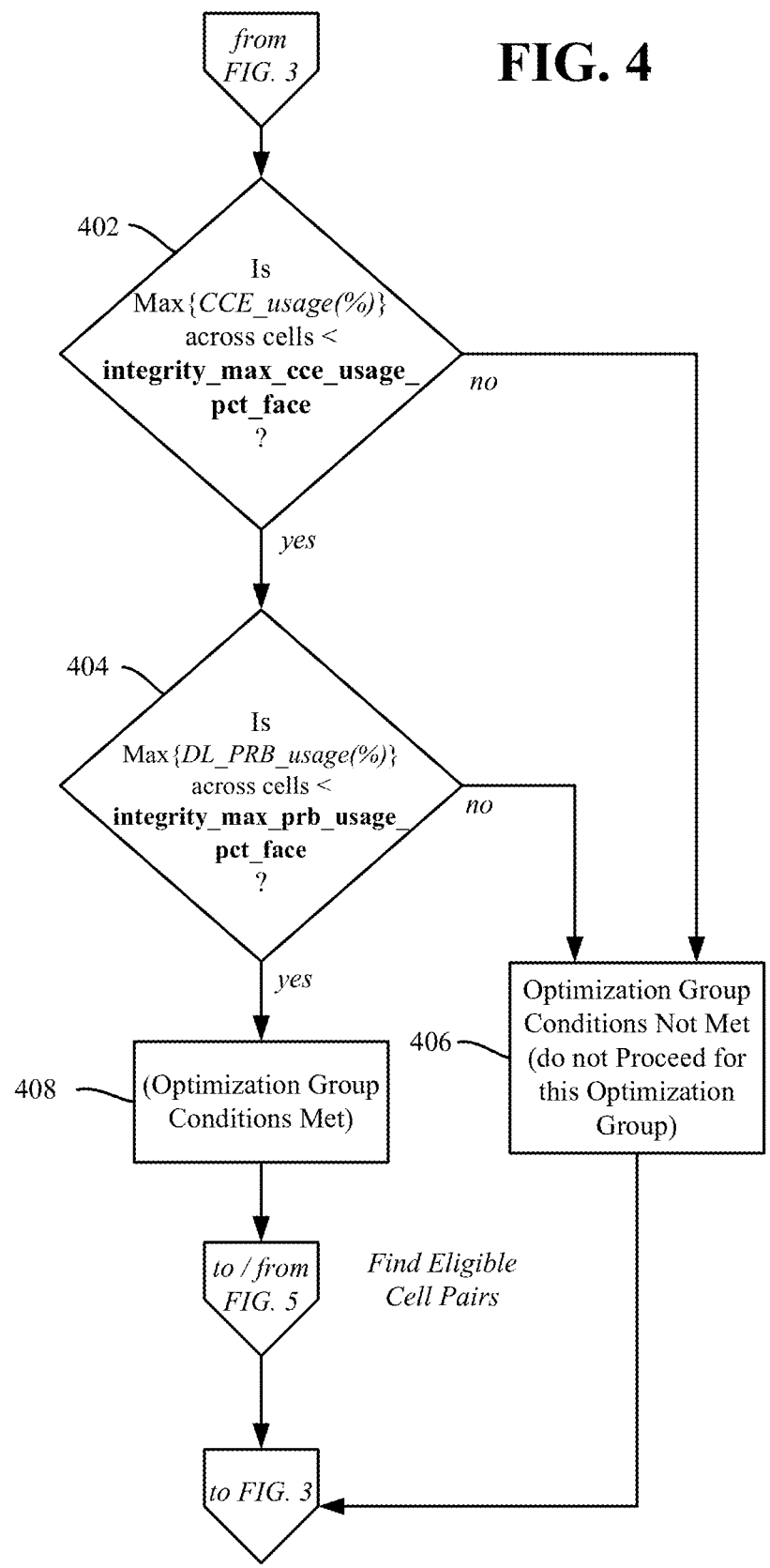
FIG. 4 is a flow diagram, (which can be coupled to FIG. 3), illustrating example operations for checking a cell optimization group's eligibility criteria, in accordance with various aspects and embodiments of the subject disclosure.
Figure 5:
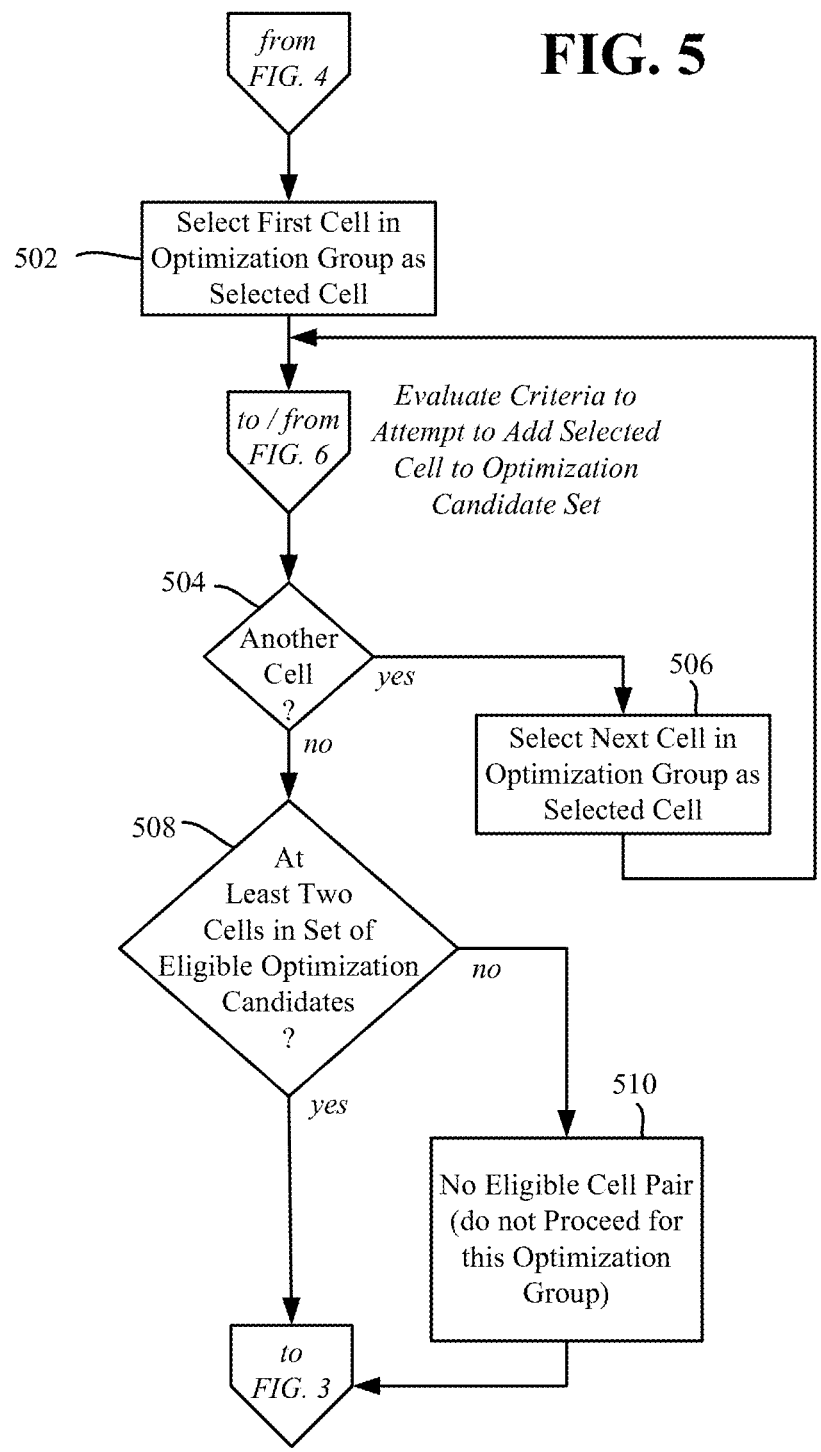
FIGS. 5 and 6 comprise a flow diagram, (which can be coupled to FIG. 3), illustrating example operations for checking whether individual cells of a cell optimization group meet cell eligibility criteria, in accordance with various aspects and embodiments of the subject disclosure.
Figure 6:
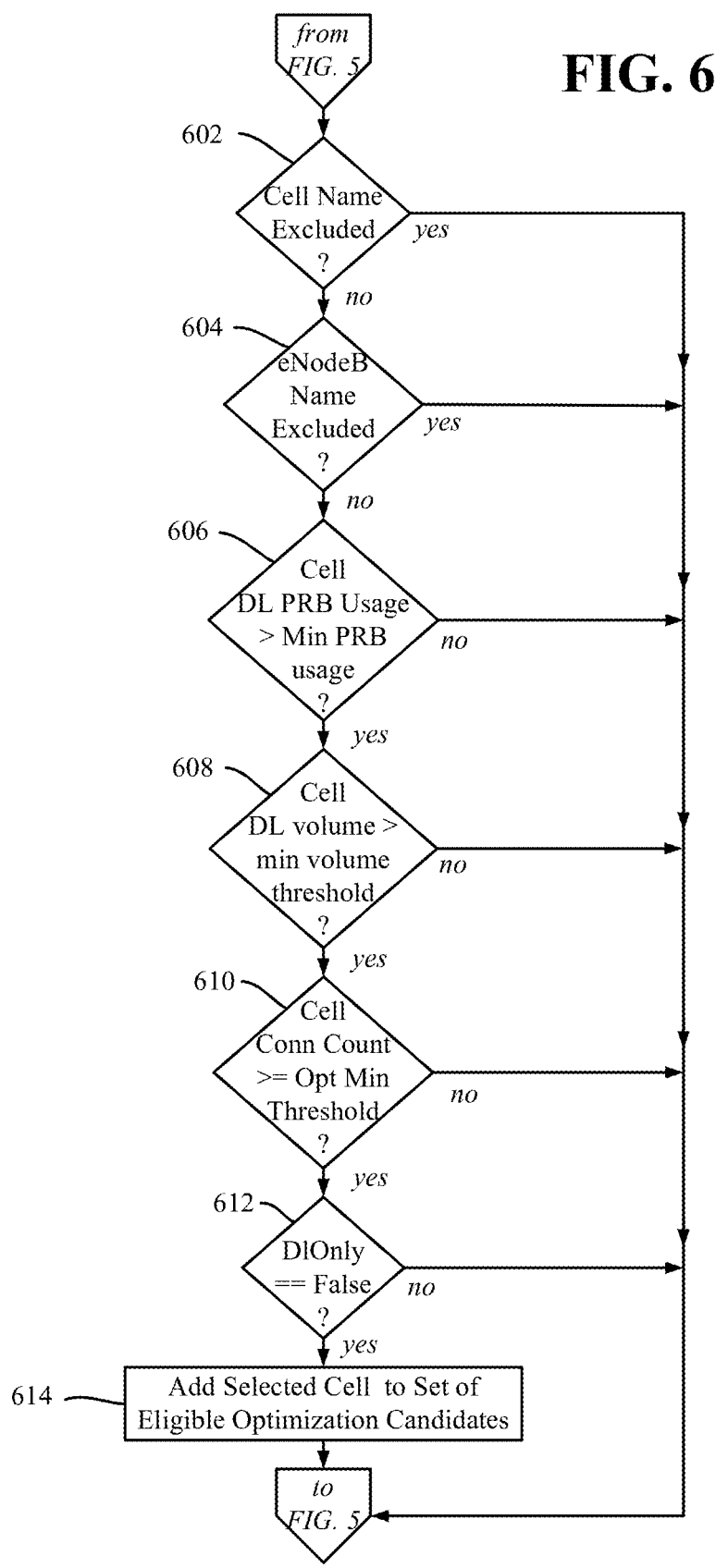

Operation 310 is directed to checking optimization eligibility criteria, and corresponds to FIGS. 4-6. For each optimization group, there are two sets of eligibility criteria, one at the optimization group level (i.e., at USID-face) and the other at the individual cell level. As used herein, the cells of an eligible group that meet the optimization eligible criteria are denoted as the set of eligible optimization candidates.

The optimization group eligibility is checked via operations 402 and 404 of FIG. 4. For the optimization group, operation 402 checks that the following control channel element (CCE) usage percentage conditions are below a user configurable usage threshold value, where the KPIs computed are shown in Italicized font, while application parameters and network configuration parameters are again in boldface:

Max{CCE_usage(%)} across cells<integrity_max_cce_usage_pct_face (user-configurable, float, default=60, min=50, max=70)

Operation 404 checks the physical resource block (PRB) usage against a corresponding user configurable PRB usage threshold value:

Max{DL_PRB_usage(%)} across cells<integrity_max_prb_usage_pct_face (user-configurable, float, default=90, min=80, max=100).

If any of these eligibility criteria conditions are not met, the group is not eligible (operation 406), and operation 312 of FIG. 3 ends the optimization for this group. Another group can then be optimized if such a group is present; (note that in one or more implementations, load balancing for each load balanced group is treated as a separate, independent (and asynchronous) instance of FIG. 3, and thus successive groups need not be handled as sequential branches from a particular instance of 312). If both of these eligibility conditions are met, the group is eligible (operation 408), and the process continues to operation 502 of FIG. 5.

Operation 502 of FIG. 5 selects a first cell in the group, and continues to operation 602 of FIG. 6 to evaluate cell-based criteria to attempt to add the selected cell to the optimization candidate set. Note that via operations 504 and 506, each of the cells in the optimization group is individually checked.

Operation 602 checks whether the cell name is not excluded, that is, the cell name does not end with any of the suffixes in user-configurable data structure (list), that is, does not end with a suffix_cell_name_to_exclude (user-configurable, list of strings). If excluded, this cell is not eligible for the candidate set.

Operation 602 checks the eNodeB name for exclusion, that is the eNodeB name does not end with a suffixes listed in suffix_enodeb_name_to_exclude (user-configurable, list of strings). If excluded, this cell is not eligible for the candidate set.

Operation 604 checks that the cell's PRB usage is above a user configurable percentage, that is, whether DL_PRB_usage (%)>integrity_min_prb_usage_pct (user-configurable, float, default=5, min=5, max=10). If not above this percentage, then the cell is not placed in the candidate set, e.g., the benefits of optimization for this cell will not be sufficient to warrant optimization.

Operation 608 checks that the cell downlink volume meets a minimum rate, that is, that cell DL_volume_cell_Mbps/1000 (kbps)>integrity_min_mac_dl_volume_kbps (user-configurable, float, default=10, min=10, max=100). If not exceeded, then the cell is not placed in the candidate set.

Operation 610 checks that the cell connection count is sufficient to warrant optimization, that is whether Cell conn_count>=(opt_min_ret_den_hourly/60)*opt_interval_minutes, where opt_min_ret_den_hourly is user-configurable, float, default=100, min=50, max=200, and opt_interval_minutes is user-configurable, integer, default=60, min=5, max=60. If not, then the cell is not placed in the candidate set.

Operation 610 checks that the cell is not in a downlink only state, that is, isDlOnly==false, where isDlOnly is a configuration parameter. If not, then the cell is not placed in the candidate set.

To summarize the general optimization eligibility criteria, for each site-face, meet that the max{CCE across carriers}<integrity_max_cce_usage_pct_face (e.g., 60%) AND max{DL PRB across carriers}<integrity_max_prb_usage_pct_face (e.g., 90%). For each cell, meet the criteria (not including the parameter checked at operation 610) that cell names do NOT end with specified suffix (suffixes for exclusion, e.g., '_E', '_F', '_L', '_DB', '_D', '_BD', '_DT', '_T', '_DT', '_TD') AND PRB usage (%)>integrity_min_prb_usage_pct (e.g., 5%) AND DL MAC volume>integrity_min_mac_dl_volume_kbps (e.g., 10 kbps) AND # of released connections>=opt_min_ret_den_hourly (e.g., 100)/60*meas_interval_minutes.

If the cell eligibility criteria are met, then the cell (identity) is placed in the candidate set, and the process returns to operation 504 of FIG. 5, which repeats the cell eligibility criteria evaluation for each other cell in the group.

When the cells have been processed, operation 508 evaluates whether there is at least two cells (at least one cell pair) in the candidate set. If not, operation 510 deems that there is no eligible cell pair (do not proceed for this optimization group), which corresponds to operation 312 of FIG. 3 ending the process for this optimization group. If instead both the group and two or more cells are eligible, the process continues to FIG. 3, operation 314/corresponding to FIG. 7 to compute optimization proposal(s) for each of the eligible cell pair(s).

Figure 7:
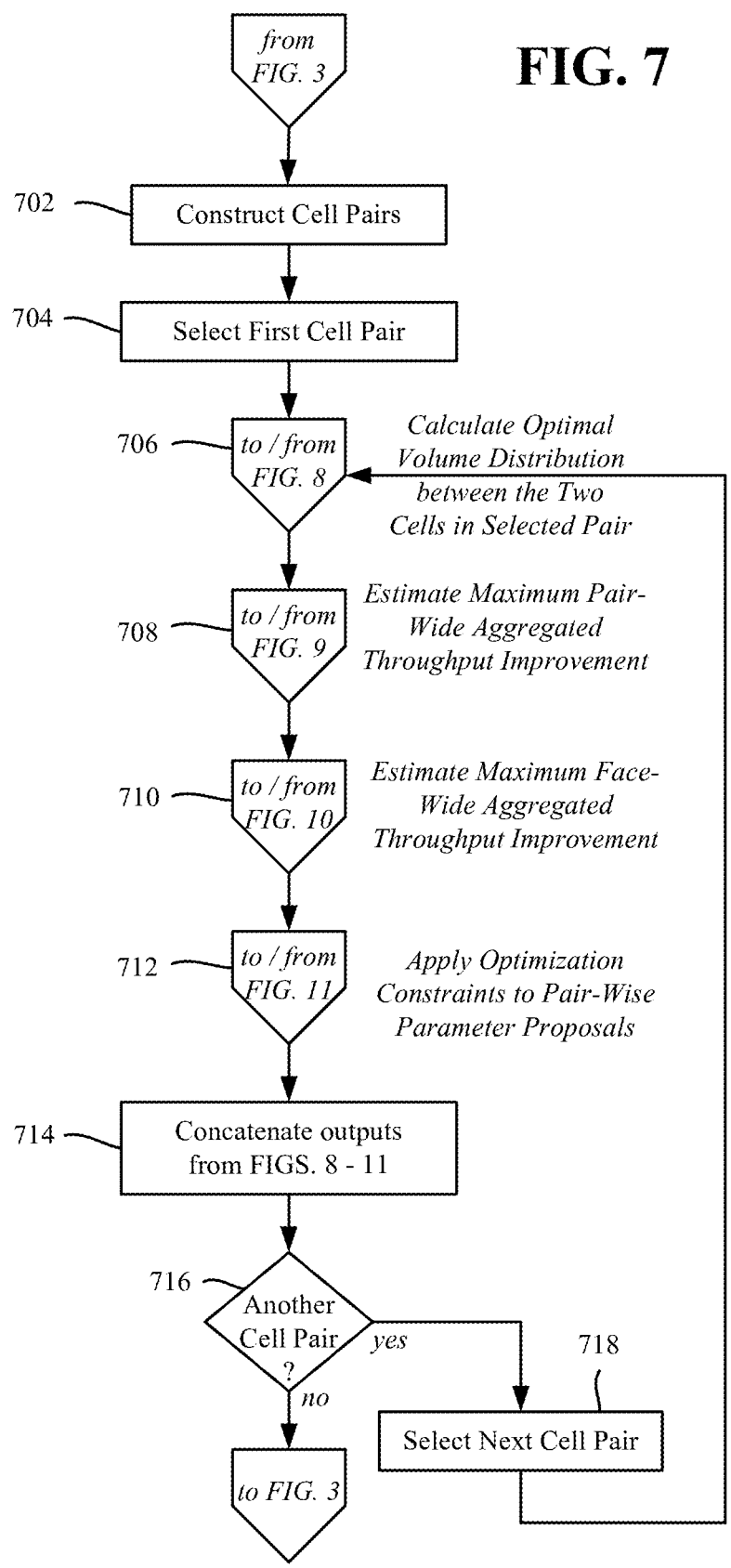
FIGS. 7-18 comprise a flow diagram, (which can be coupled to FIG. 3), illustrating example operations for determining handover change proposals for eligible cells of a cell optimization group, in accordance with various aspects and embodiments of the subject disclosure.
Figure 8:
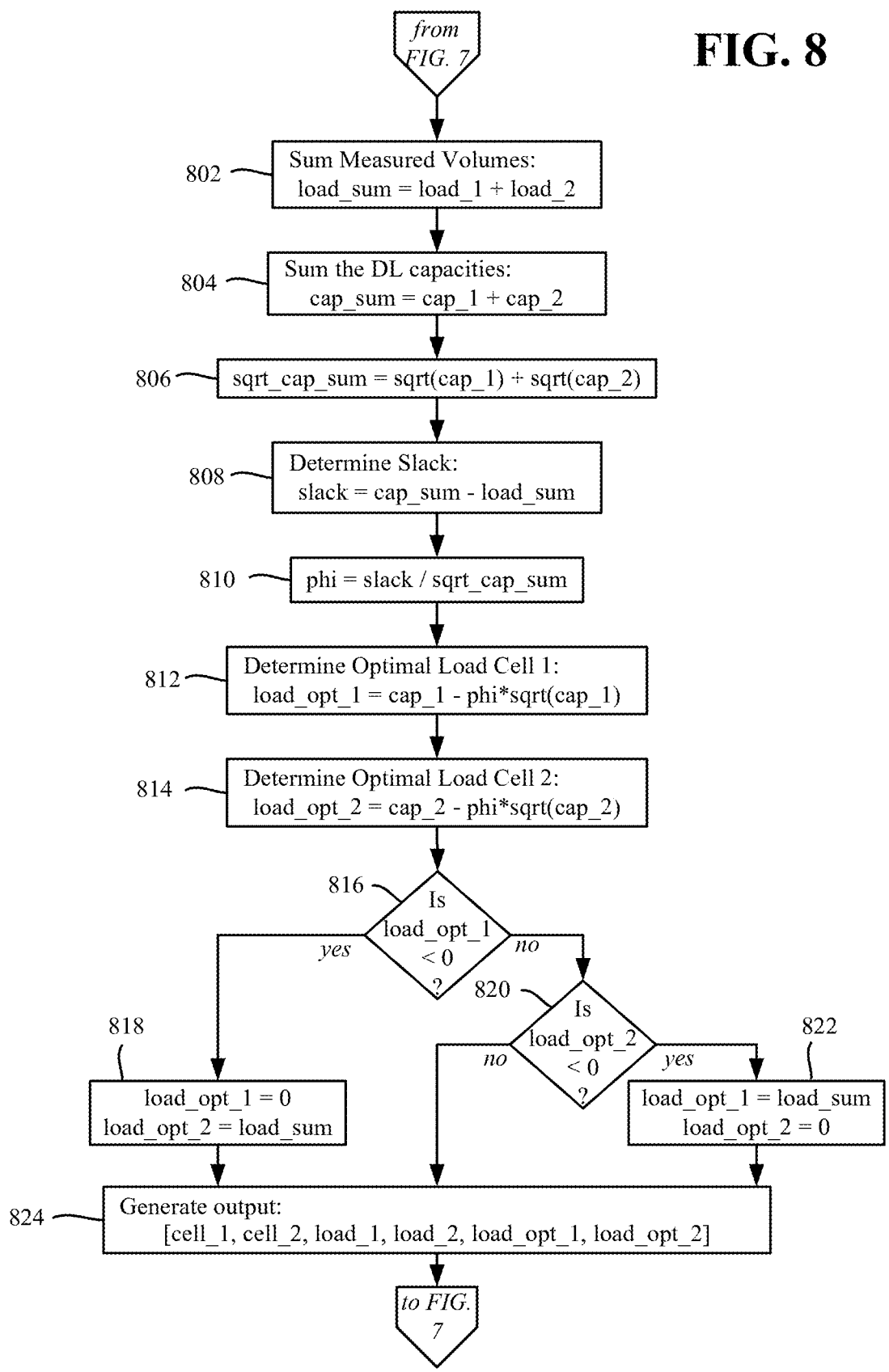
Figure 9:
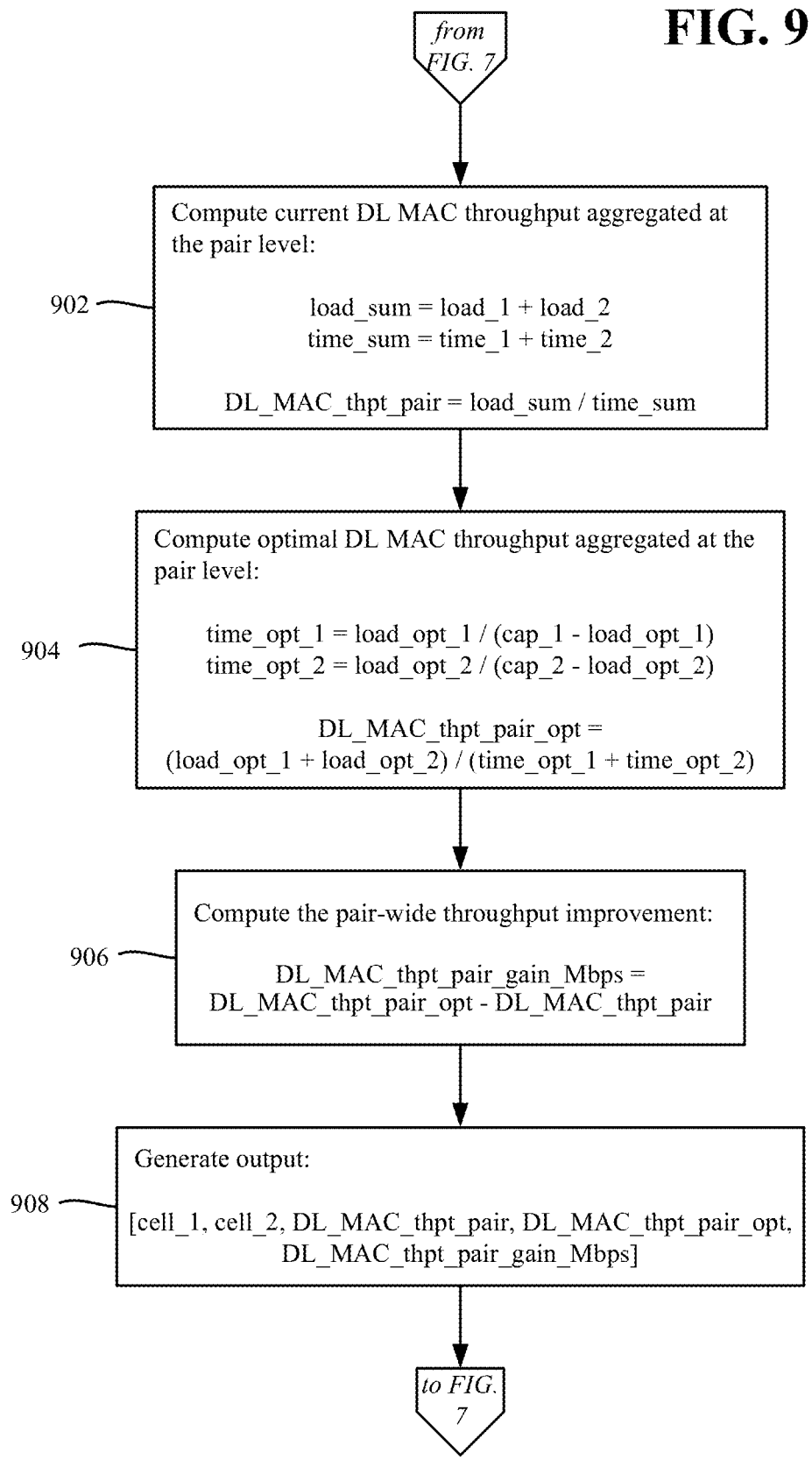
Figure 10:
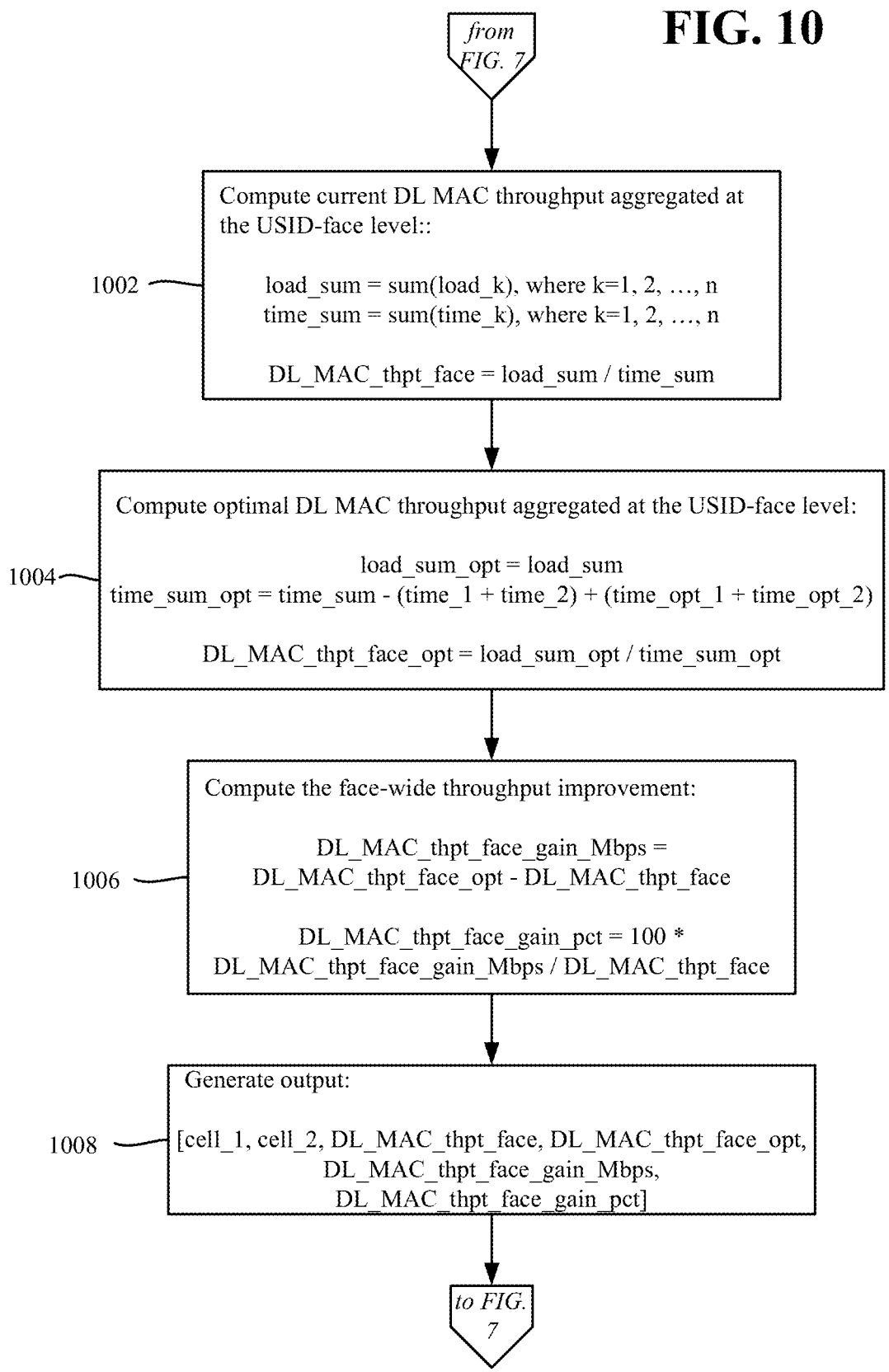
Figure 11:
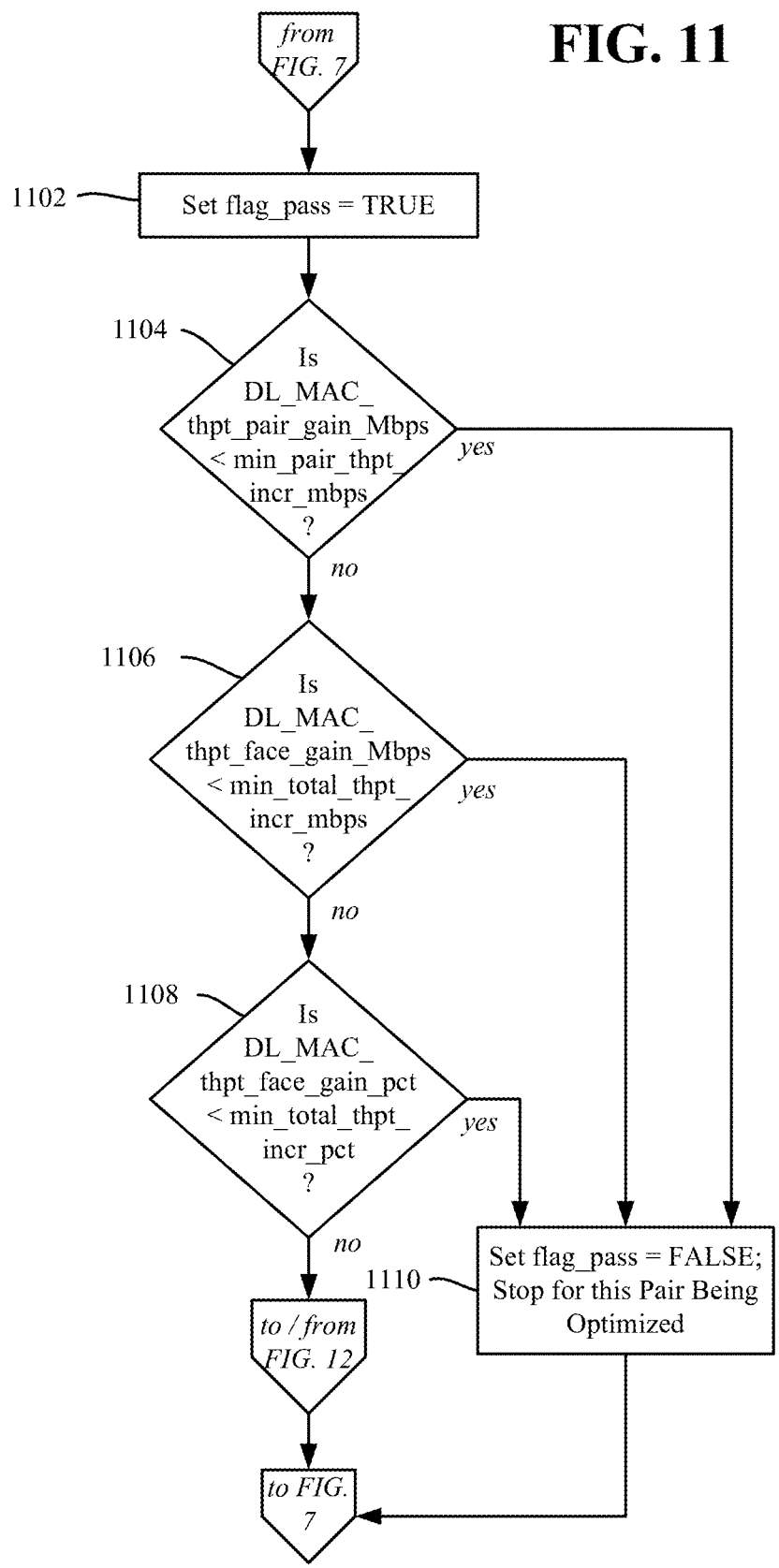

Operation 702 of FIG. 7 constructs the cell pairs from the optimization candidate cells for the group, by identifying the unique (undirected) cell pairs. For example, if the set of eligible optimization candidate cells={cell_1, cell_2, cell_3}, then the constructed set of unique cell pairs is {(cell_1, cell_2), (cell_1, cell_3), (cell_2, cell_3)}. For each such unique cell pair as selected via operation 704, the following operations are performed:

Operation 706: calculate the optimal volume distribution between the two cells according to the operations of FIG. 8;

Operation 708: estimate maximum pair-wide aggregated throughput improvement according to the operations of FIG. 9;

Operation 710: estimate maximum face-wide aggregated throughput improvement according to the operations of FIG. 10;

Operation 712: apply optimization constraints to pair-wide parameter proposals according to the operations of FIG. 11 (and other figures branched thereto from FIG. 11);

Operation 714: concatenate outputs from FIGS. 8-11.

Turning to FIG. 8, to calculate the optimal volume distribution between the two cells, denote the two cells as cell_1 and cell_2. For cell_1 and cell_2, respectively, denote the downlink capacity (DL_cell_capacity_Mbps) as cap_1 and cap_2, denote the current measured downlink (media access control) MAC volume being carried (DL_volume_cell_Mbps) as load_1 and load_2, and denote the optimal downlink MAC volume (i.e., output of the algorithm) as load_opt_1 and load_opt_2.

Operation 802 sums the measured volumes (load_sum=load_1+load_2) and operation 804 sums the downlink (DL) capacities (cap_sum=cap_1+cap_2). Operation 806 obtains the sum of square roots of the capacities, sqrt_cap_sum=sqrt(cap_1)+sqrt(cap_2), operation 808 determines the slack capacity as slack=cap_sum−load_sum and operation 810 computes a value based on the slack capacity and the summed square roots as phi=slack/sqrt_cap_sum.

From these computations, operations 812 and 814 determine optimal loads for the cells, respectively as
load_opt_1=cap_1−phi*sqrt(cap_1) and
load_opt_2=cap_2−phi*sqrt(cap_2).

If at operation 816 the load_opt_1<0, then operation 818 sets the load_opt_1=0 and the load_opt_2=load_sum that was computed. If (else) the load_opt_1 was not less than zero, operation 820 evaluates whether load_opt_2<0, and if so, operation 822 sets load_opt_1=load_sum and load_opt_2=0.

Operation 824 generates the output for the two cells of the pair, which includes their identities, their loads, and their optimal loads, [cell_1, cell_2, load_1, load_2, load_opt_1, load_opt_2]. The process returns from FIG. 8 and operation 708 of FIG. 7 continues the process at operation 902 of FIG. 9, where FIG. 9 estimates the maximum pair-wide aggregated throughput improvement for this cell pair.

More particularly, with respect to FIG. 9, continue to denote the two cells as cell_1 and cell_2. Similarly, for cell_1 and cell_2, respectively, denote the DL capacity (DL_cell_capacity_Mbps) as cap_1 and cap_2, the current measured DL MAC volume (DL_volume_cell_Mbps) being carried as load_1 and load_2, the optimal DL MAC volume (computed by FIG. 8) as load_opt_1 and load_opt_2. Denote the DL MAC throughput time (DL_MAC_throughput_time_sec) as time_1, time_2, and the optimal DL MAC throughput time associated with the optimal DL MAC volume as time_opt_1 and time_opt_2.

Operation 902 computes the current DL MAC throughput aggregated at the pair level:
load_sum=load_1+load_2
time_sum=time_1+time_2 (where time_1=load_1/(cap_1−load_1), and time_2=load_2/(cap_2−load_2)
DL_MAC_thpt_pair=load_sum/time_sum.

Operation 904 computes the optimal DL MAC throughput (DL_MAC_thpt_pair_opt) aggregated at the pair level based on the load and capacity data:
time_opt_1=load_opt_1/(cap_1−load_opt_1)
time_opt_2=load_opt_2/(cap_2−load_opt_2)
DL_MAC_thpt_pair_opt=(load_opt_1+load_opt_2)/(time_opt_1+time_opt_2).

Operation 906 computes the pair-wise throughput improvement (gain rate):
DL_MAC_thpt_pair_gain_Mbps=DL_MAC_thpt_pair_opt−DL_MAC_thpt_pair.

Operation 908 generates output based on these computations as [cell_1, cell_2, DL_MAC_thpt_pair, DL_MAC_thpt_pair_opt, DL_MAC_thpt_pair_gain_Mbps]. The process returns from FIG. 9 to FIG. 7, where operation 710 continues the process at operation 1002 of FIG. 10.

FIG. 10 is directed to estimating the maximum face-wide aggregated throughput improvement, where as before, cell_1 and cell_2 refer to the two cells of the pair being optimized for convenience. Further, denote the list of cells as cell_1, cell_2, . . . , cell_n, where n is the number of cells in the USID-face. For cell_1, cell_2, . . . , cell_n, respectively, denote the current measured DL MAC volume being carried (DL_volume_cell_Mbps) as load_1 and load_2, . . . , load_n, and the DL MAC throughput time from FIG. 9 (DL_MAC_throughput_time_sec) as time_1, time_2, . . . , time_n. For cell_1 and cell_2 of the pair being optimized, respectively, denote the optimal DL MAC volume from FIG. 8 as load_opt_1 and load_opt_2, and the optimal DL MAC throughput time from FIG. 9 as time_opt_1 and time_opt_2.

Operation 1002 computes the current DL MAC throughput aggregated at the USID-face level:
load_sum=sum(load_k), where k=1, 2, . . . , n
time_sum=sum(time_k), where k=1, 2, . . . , n
DL_MAC_thpt_face=load_sum/time_sum Operation 1004 computes the optimal DL MAC throughput aggregated at the USID-face level:
load_sum_opt=load_sum
time_sum_opt=time_sum−(time_1+time_2)+(time_opt_1+time_opt_2)
DL_MAC_thpt_face_opt=load_sum_opt/time_sum_opt Operation 1006 computes the face-wide throughput improvement in rate and percentage values:
DL_MAC_thpt_face_gain_Mbps=DL_MAC_thpt_face_opt−DL_MAC_thpt_face
DL_MAC_thpt_face_gain_pct=100*DL_MAC_thpt_face_gain_Mbps/DL_MAC_thpt_face Operation 1008 generates output for the gain to be obtained by optimizing the selected cell pair as [cell_1, cell_2, DL_MAC_thpt_face, DL_MAC_thpt_face_opt, DL_MAC_thpt_face_gain_Mbps, DL_MAC_thpt_face_gain_pct]

The process returns from FIG. 10 to FIG. 7, where operation 712 continues the optimization process for the currently selected cell pair at operation 1102 of FIG. 11. In general, FIG. 11 applies optimization constraints to pairwise parameter proposals for the currently selected pair of cells.

With respect to FIG. 11, denote flag_pass as a flag to indicate whether the constraints are met. Denote traffic_direction as the direction of traffic movement for the given pair being optimized. Further, denote the current and new values of the parameters cellIndividualOffsetEUtran, qOffsetCellEUtran, and amoAllowed from cell_i to cell_j as cellIndividualOffsetEUtran_current_i_to_j, cellIndividualOffsetEUtran_new_i_to_j, qOffsetCellEUtran_current_i_to_j, qOffsetCellEUtran_new_i_to_j, amoAllowed_current_i_to_j, and amoAllowed_new_i_to_j, respectively. Note that cellIndividualOffsetEUtran and qOffsetCellEUtran are 3GP-compliant standardized parameters, while amoAllowed is a vendor-specific parameter that allows operator to disable a vendor specific feature (in this case, AMO) that optimizes the same parameters (cellIndividualOffsetEUtran, qOffsetCellEUtran) for different objectives.

Operation 1102 sets the value of flag_pass to TRUE. Operation 1104 evaluates the cell pair throughput gain rate to be obtained with respect to at least achieving a minimum cell pair gain constraint value; operation 1106 evaluates the face throughput gain rate to be obtained with respect to at least achieving a minimum face gain constraint value, and operation 1106 evaluates the throughput face gain percentage to be obtained with respect to at least achieving a minimum face gain constraint percentage. If any constraint is not met, operation 1110 sets flag_pass=FALSE and stops this pair from being optimized (returning to FIG. 7, that is:

Set flag_pass=FALSE (and stop for this cell pair) if:
DL_MAC_thpt_pair_gain_Mbps<min_pair_thpt_incr_mbps OR
DL_MAC_thpt_face_gain_Mbps<min_total_thpt_incr_mbps OR
DL_MAC_thpt_face_gain_pct<min_total_thpt_incr_pct.

Figure 12:
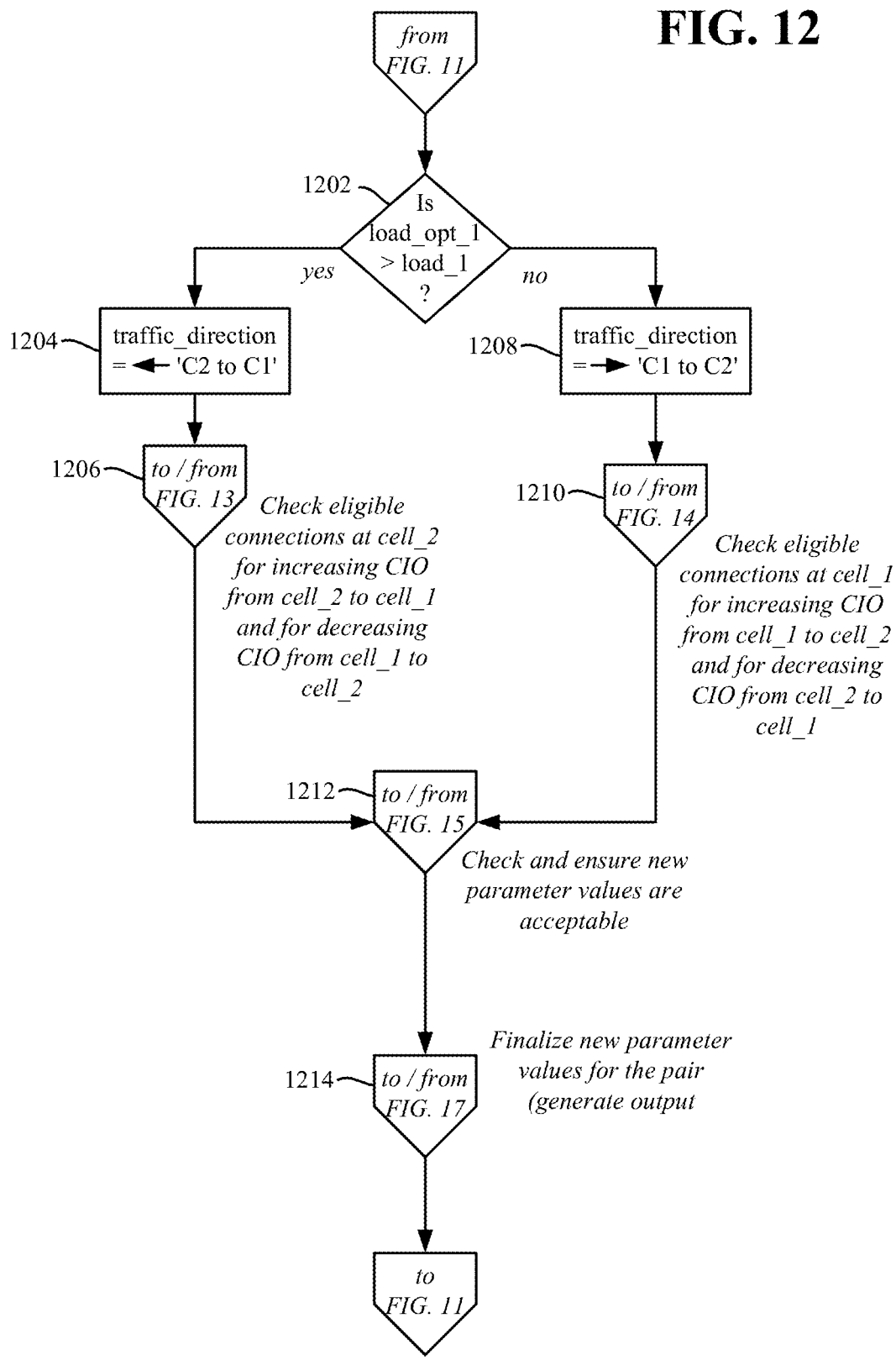

If the constraints evaluated at FIG. 11 were met, the process continues to operation 1202 of FIG. 12, which for cell_1 and cell_2 of the pair being optimized, denotes the IFHO (inter-frequency handover) coverage eligible connection count (conn_count_IFHO_COV_eligible) as conn_elig_1 and conn_elig_2, and the number of coverage based IFHO from cell_1 to cell_2 as ifho_cov_from_cell1_to_cell2 (IFHO_COV_execution_count_per_nbr_cell where source cell=cell_1 and neighbor cell=cell_2), and the number of coverage based IFHO from cell_2 to cell_1 as ifho_cov_from_cell2_to_cell1 (IFHO_COV_execution_count_per_nbr_cell where source cell=cell_2 and neighbor cell=cell_1), and as before, the optimal DL MAC volume from FIG. 8 as load_opt_1 and load_opt_2, and the current measured DL MAC volume being carried (DL_volume_cell_Mbps) as load_1 and load_2.

Operation 1202 determines the direction to change the traffic, based on whether load_opt_1>load_1. If so, the traffic volume migration is from C2 to C1 (operation 1204) and the process continues via operation 1206 to FIG. 13, which check eligible connections at cell_2 for increasing CIO (cellIndividualOffset) from cell_2 to cell_1 and for decreasing CIO from cell_1 to cell_2. Note that increasing $CIO_{AB}$ encourages more handoffs from cell_A to cell_B, hence shifts traffic from cell_A to cell_B. Analogously, decreasing $CIO_{BA}$ discourages the prevailing handoff rate from cell_B to cell_A, and has the same load transfer impact (increasing one cell's handoff rate to the other inherently reduces its traffic load, and vice-versa, regardless if the other cell decreases its handoff rate). Notwithstanding, increasing the handoff rate of one cell while decreasing the handoff rate on the other, paired cell may be used concurrently to achieve a greater amount of shift. If load_opt_1 is not greater than load_1, operation 1208 sets the traffic volume migration from C1 to C2 and the process continues via operation 1210 to FIG. 14, check eligible connections at cell_1 for increasing CIO from cell_1 to cell_2 and for decreasing CIO from cell_2 to cell_1.

Note that another set of parameters, qOffsetFreq functions basically identically, except that they operate across frequency bands rather than across individual cell pairs.

Figure 13:
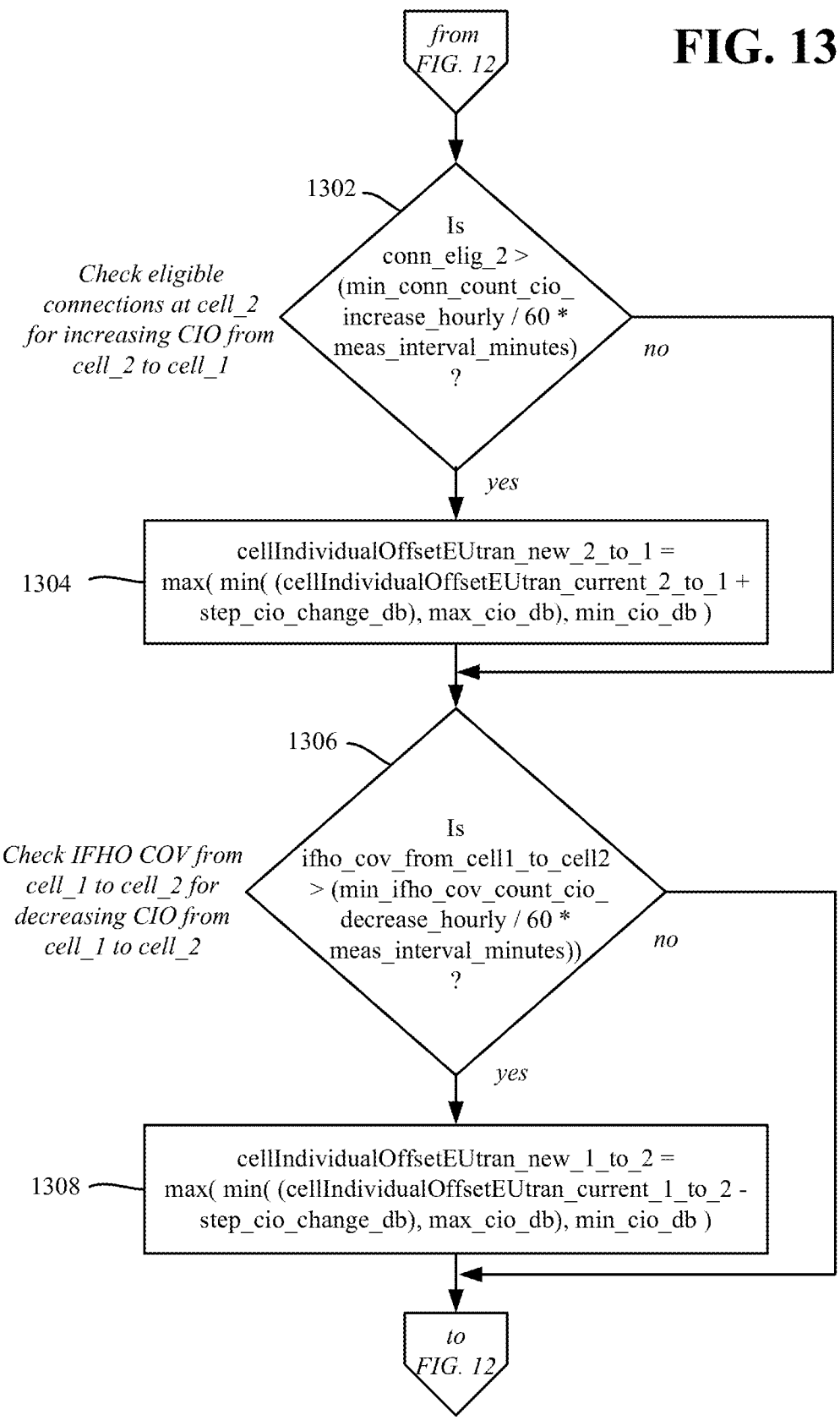

In FIG. 13, eligible connections at cell_2 for increasing CIO from cell_2 to cell_1 are checked at operation 1302, that is, if conn_elig_2>(min_conn_count_cio_increase_hourly/60*meas_interval_minutes), then at operation 1304 set cellIndividualOffsetEUtran_new_2_to_1=max (min((cellIndividualOffsetEUtran_current_2_to_1+step_cio_change_db), max_cio_db), min_cio_db).

Operation 1306 evaluates IFHO COV from cell_1 to cell_2 for decreasing CIO from cell_1 to cell_2, that is, if ifho_cov_from_cell1_to_cell2>(min_ifho_cov_count_cio_decrease_hourly/60*meas_interval_minutes, set cellIndividualOffsetEUtran_new_1_to_2=max(min ((cellIndividualOffsetEUtran_current_1_to_2-step_cio_change_db), max_cio_db), min_cio_db).

Figure 14:
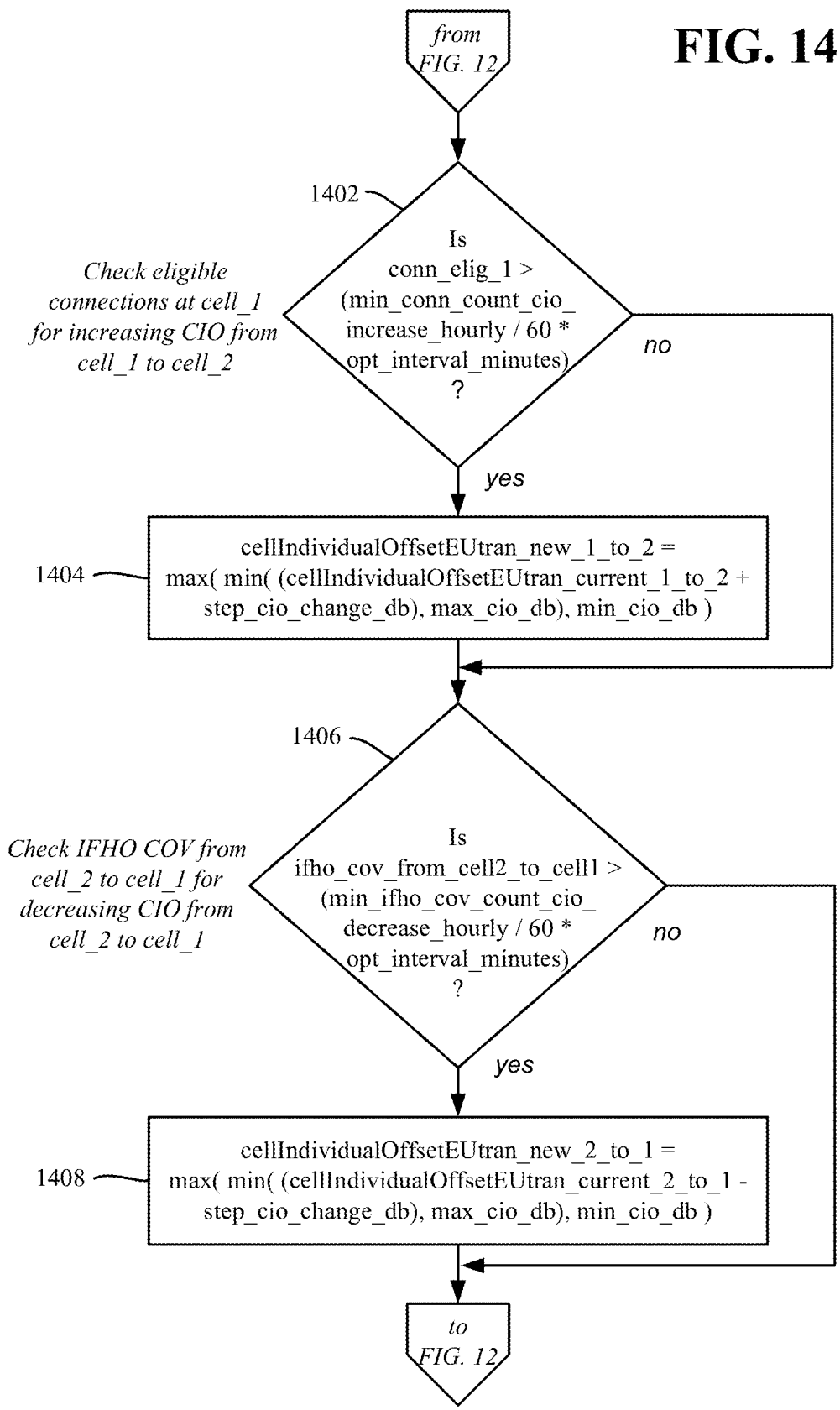

If instead the traffic direction is to be in the opposite direction, operation 1210 continues to FIG. 14 to check eligible connections at cell_1 for increasing CIO from cell_1 to cell_2 and for decreasing CIO from cell_2 to cell_1. More particularly, operation 1402 checks eligible connections at cell_1 for increasing CIO from cell_1 to cell_2, as If conn_elig_1>(min_conn_count_cio_increase_hourly/60*opt_interval_minutes), then at operation 1404 set cellIndividualOffsetEUtran_new_1_to_2=max(min ((cellIndividualOffsetEUtran_current_1_to_2+step_cio_change_db), max_cio_db), min_cio_db).

Further, at operation 1406 checks IFHO COV from cell_2 to cell_1 for decreasing CIO from cell_2 to cell_1, as if ifho_cov_from_cell2_to_cell1>(min_ifho_cov_count_cio_decrease_hourly/60*opt_interval_minutes), then at operation 1408 set cellIndividualOffsetEUtran_new_2_to_1=max(min ((cellIndividualOffsetEUtran_current_2_to_1-step_cio_change_db), max_cio_db), min_cio_db).

Figure 15:
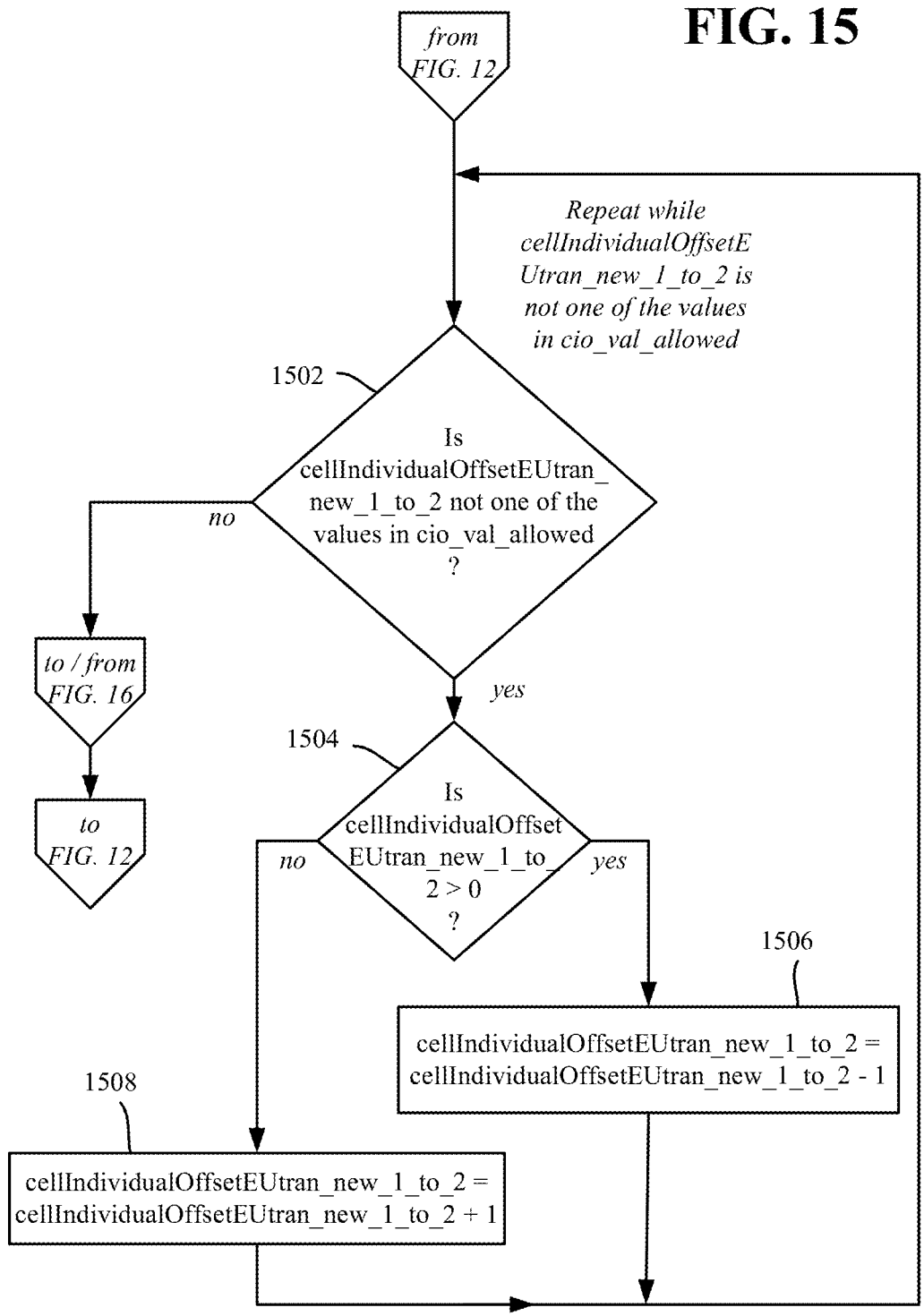
Figure 16:
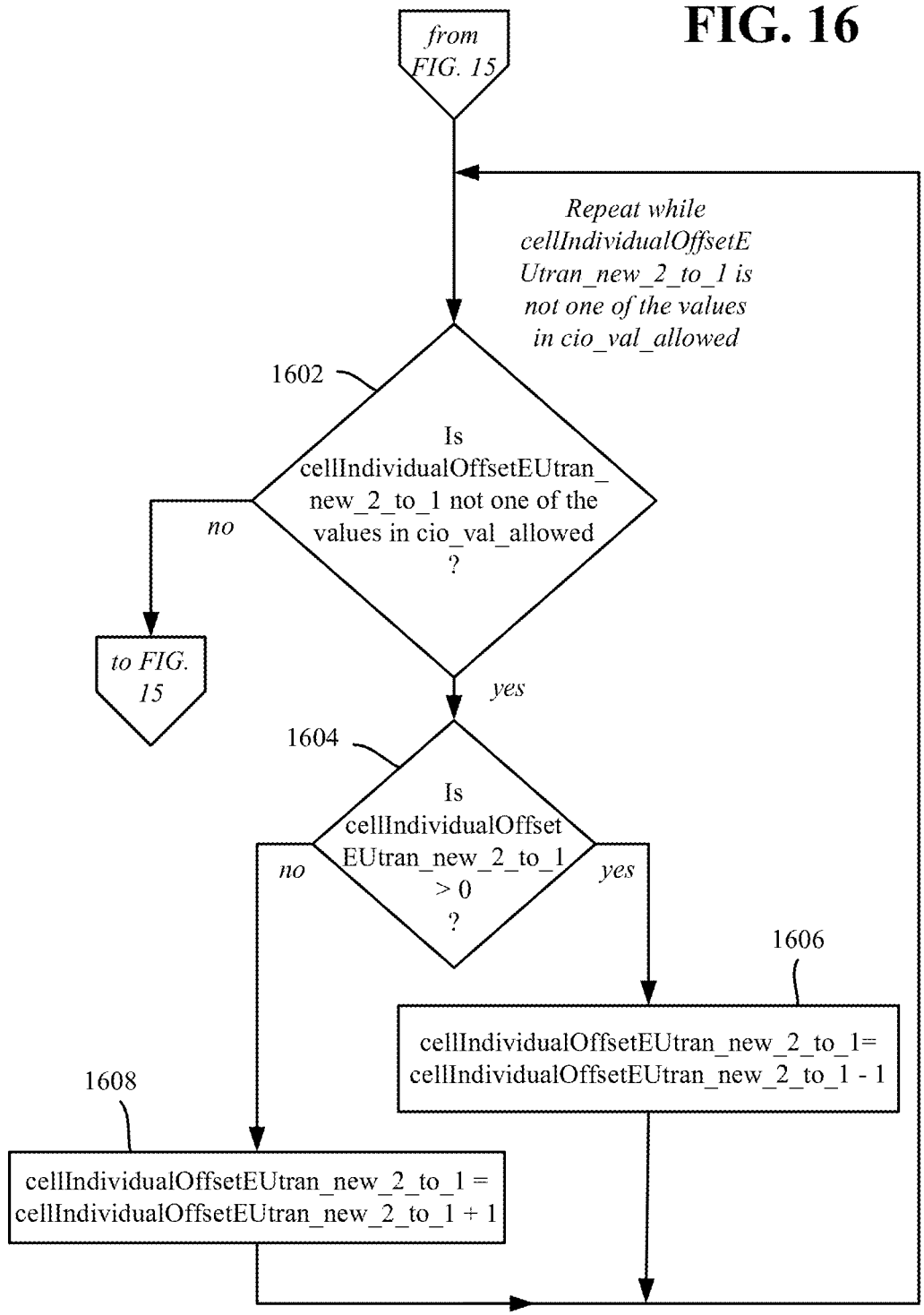

As shown in FIG. 12, following operation 1206 (FIG. 13) or operation 1210 (FIG. 14), the process continues to operation 1212, corresponding to FIGS. 15 and 16 to check and ensure the new parameter values are acceptable. To this end, operation 1502 checks whether cellIndividualOffsetEUtran_new_1_to_2 is not one of the values in cio_val_allowed, and if so, starts a while loop that modifies the new parameter values, repeating as needed until the new value is allowed. More particularly, if at operation 1504 cellIndividualOffsetEUtran_new_1_to_2>0, then adjust, via operation 1506, cellIndividualOffsetEUtran_new_1_to_2=cellIndividualOffsetEUtran_new_1_to_2-1, otherwise adjust, via operation 1508, cellIndividualOffsetEUtran_new_1_to_2= cellIndividualOffsetEUtran_new_1_to_2+1. The process continues to FIG. 16.

FIG. 16 is similar to FIG. 15, except the new 2_to_1 value (instead of 1_to_2) is evaluated. Thus, operation 1602 checks whether cellIndividualOffsetEUtran_new_2_to_1 is not one of the values in cio_val_allowed, and if so, starts a while loop that modifies the new parameter values, repeating as needed until the new value is allowed. More particularly, if at operation 1604 cellIndividualOffsetEUtran_new_2_to_1>0, then adjust, via operation 1606, cellIndividualOffsetEUtran_new_2_to_1=cellIndividualOffsetEUtran_new_2_to_1-1, otherwise adjust, via operation 1508, cellIndividualOffsetEUtran_new_2_to_1= cellIndividualOffsetEUtran_new_2_to_1+1. The process continues to FIG. 15 and from there to FIG. 12, operation 1214.

To summarize the optimization criteria, for each site-face, meet the criterion that the increase (in Mbps) in overall MAC UE throughput>min_total_thpt_incr_mbps (e.g., 0.5 Mbps) AND the criteria for relative increase (in %) in overall MAC UE throughput>min_total_thpt_incr_pct (e.g., 5%). If those criteria are met, for each candidate source-neighbor pair evaluate whether the increase (in Mbps) in per-pair MAC UE throughput>min_pair_thpt_incr_mbps (e.g., 1 Mbps), and, for increasing CIO from cent to cell2 that the number of connections whose serving RSRQ (Reference Signal Received Quality)<a certain threshold (e.g., −16 dB)>=(min_conn_count_cio_increase_hourly (e.g., 100)/60*meas_interval_minutes) or for decreasing CIO from cell1 to cell2, that the muber of COV based IFHO from cell1 to cell2>=(min_ifho_cov_count_cio_decrease_hourly (e.g., 50)/60*meas_interval_minutes).

Figure 17:
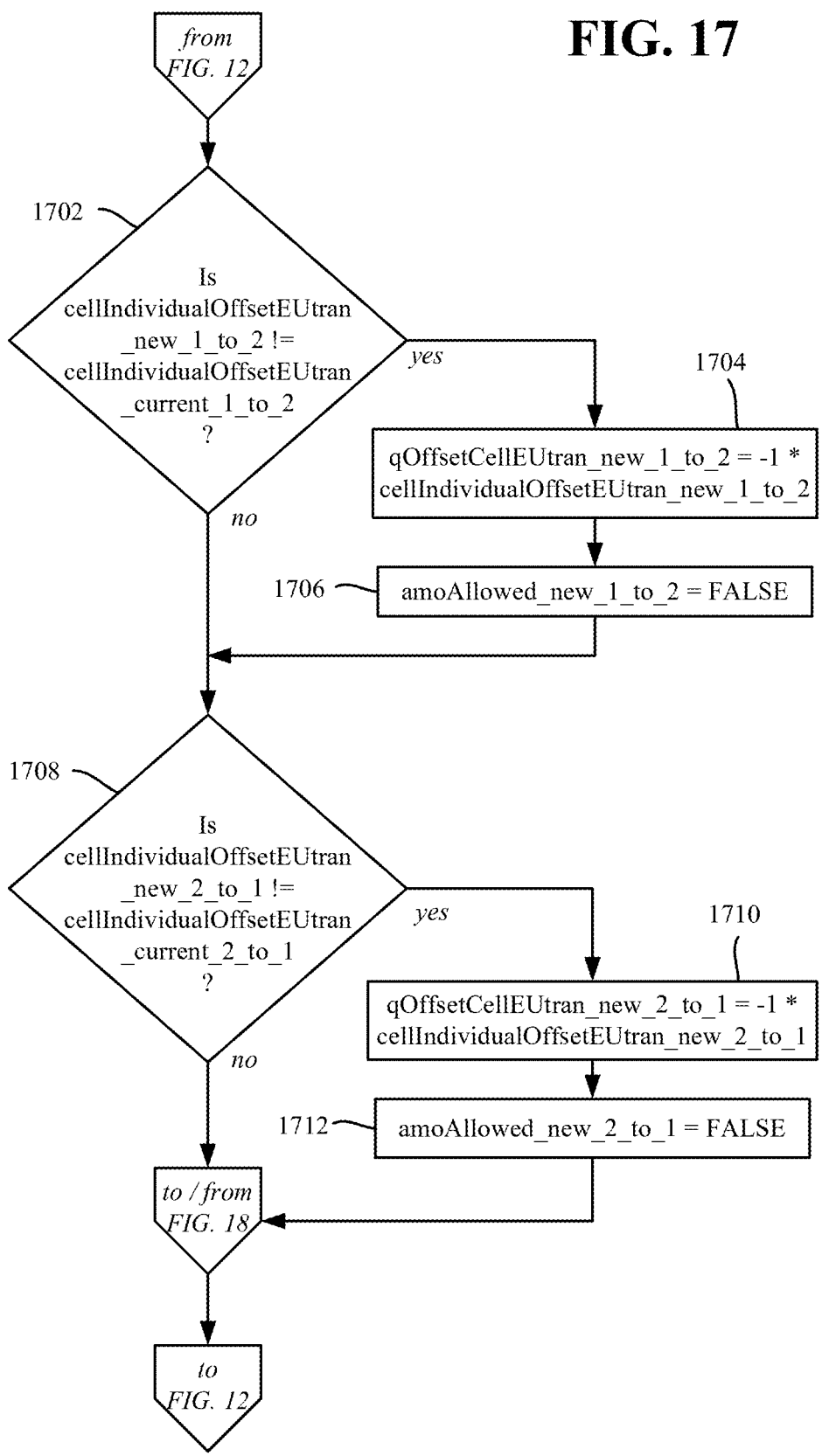
Figure 18:
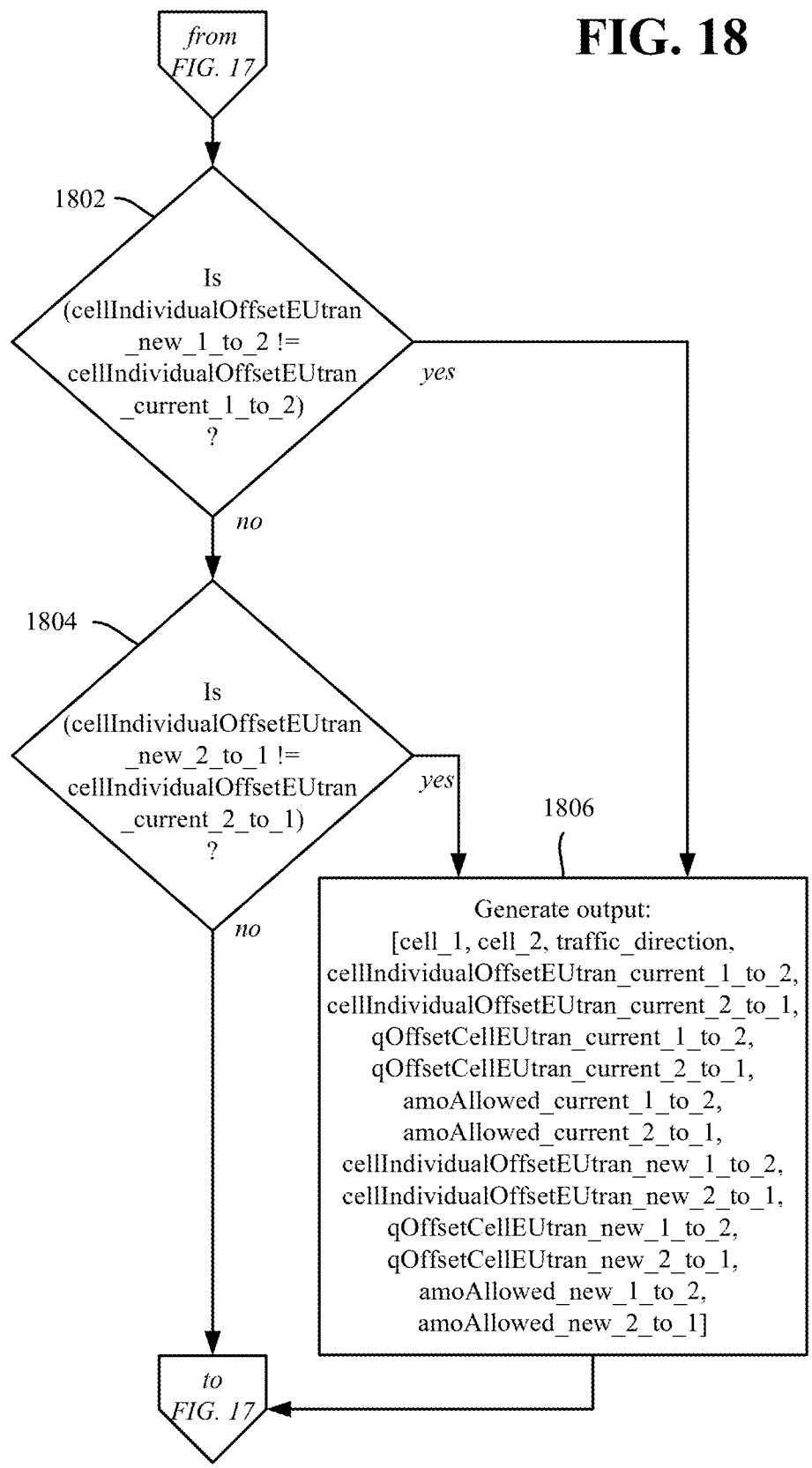

FIG. 12, operation 1214 corresponds to FIGS. 17 and 18, which finalize the new parameter values for the pair (to generate output for the cell pair). More particularly, if at operation 1702 cellIndividualOffsetEUtran_new_1_to_2 does not equal cellIndividualOffsetEUtran_current_1_to_2, operation 1704 sets qOffsetCellEUtran_new_1_to_2=−1*cellIndividualOffsetEUtran_new_1_to_2, and operation 1706 sets amoAllowed_new_1_to_2=FALSE.

At operation 1708, if cellIndividualOffsetEUtran_new_2_to_1 does not equal cellIndividualOffsetEUtran_current_2_to_1, operation 1710 sets qOffsetCellEUtran_new_2_to_1=−1* cellIndividualOffsetEUtran_new_2_to_1 and operation 1712 sets amoAllowed_new_2_to_1=FALSE. The process continues to operation 1802 of FIG. 18.

If, via operation 1802 or 1804 additional conditions are met, then finalized output for the cell pairs is generated at operation 1806. More particularly, generate the output: if (cellIndividualOffsetEUtran_new_1_to_2!= cellIndividualOffsetEUtran_current_1_to_2) (operation 1802) OR (cellIndividualOffsetEUtran_new_2_to_1!=cellIndividualOffsetEUtran_current_2_to_1) (operation 1804).

Operation 1806 generates the output as: [cell_1, cell_2, traffic_direction, cellIndividualOffsetEUtran_current_1_to_2, cellIndividualOffsetEUtran_current_2_to_1, qOffsetCellEUtran_current_1_to_2, qOffsetCellEUtran_current_2_to_1,
amoAllowed_current_1_to_2,
amoAllowed_current_2_to_1,
cellIndividualOffsetEUtran_new_1_to_2,
cellIndividualOffsetEUtran_new_2_to_1,
qOffsetCellEUtran_new_1_to_2,
qOffsetCellEUtran_new_2_to_1,
amoAllowed_new_1_to_2, amoAllowed_new_2_to_11.

The process returns to operation 714 of FIG. 7 to concatenate the output (with those of any other cell pairs). Operations 716 and 718 repeat for another constructed cell pairs, if any, until none remain unprocessed via FIGS. 8-18.

Once the constructed cell pairs are processed, FIG. 3 operation 316 evaluates whether there are any proposed changes to bias the handover between cell pairs. If not, the process ends for this group, otherwise the process continues to FIGS. 19-23 to finalize the proposed changes.

FIG. 19, operation 1902 represents importing the concatenated output following operation 714 of FIG. 7, one set for each eligible cell pair. Any eligible cell pair for which no output was generated via the operations of FIG. 18 is excluded.

Operation 1904 sorts the remaining eligible pairs by face gain throughput rate (DL_MAC_thpt_face_gain_Mbps) in descending order. The final list of proposals is denoted as list_proposal, with list_proposal initially set to an empty set, list_proposal=[ ]. Each entry will be of the format: [cell_src, cell_tgt, param_name, param_value].

To this end, selecting the first pair (after sorting) at operation 1906, operation 1908 evaluates whether a count of pairs to change (incremented at operation 2110 of FIG. 21) exceeds a maximum number, that is, whether num_pair_final>max_num_pairs_change. This maximum value can be used to limit how many handover biasing changes are made between cell pairs.

If the maximum value is not exceeded, operation 1910 evaluates whether cell_1 or cell_2 of the pair is already included in the list_proposal, and if so, skips this cell pair. Note that a cell and thus a cell pair is thus only changed once with respect to handover biasing. If neither cell is already listed, the process continues to FIG. 20 to evaluate other situations/conditions in which the pair may be skipped.

Figure 20:
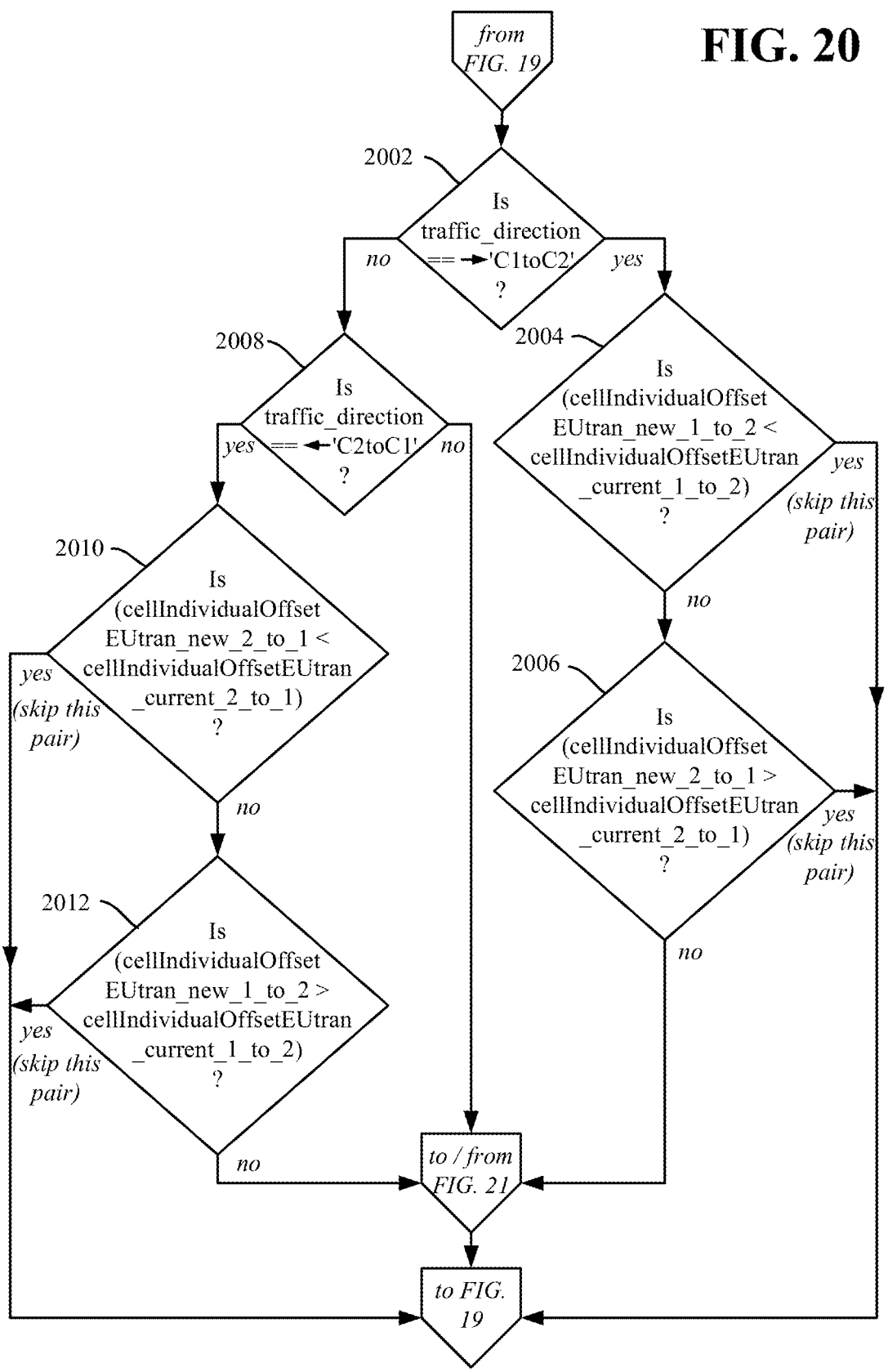

FIG. 20, operation 2002 branches based on the traffic direction. If the direction is from cell_1 to cell_2, if via operation 2004 (cellIndividualOffsetEUtran_new_ 1_to_2<cellIndividualOffsetEUtran_current_1_to_2) OR via operation 2006 (cellIndividualOffsetEUtran_ new_2_to_1>cellIndividualOffsetEUtran_current_2_to_1), the process skips this pair. If instead at operation 2008 the direction is from cell_2 to cell_1, if via operation 2010 (cellIndividualOffsetEUtran_new_2_to_ 1<cellIndividualOffsetEUtran_current_2_to_1) OR via operation 2012 (cellIndividualOffsetEUtran_ new_1_to_2>cellIndividualOffsetEUtran_current_1_to_2), the process skips this pair.

Figure 21:
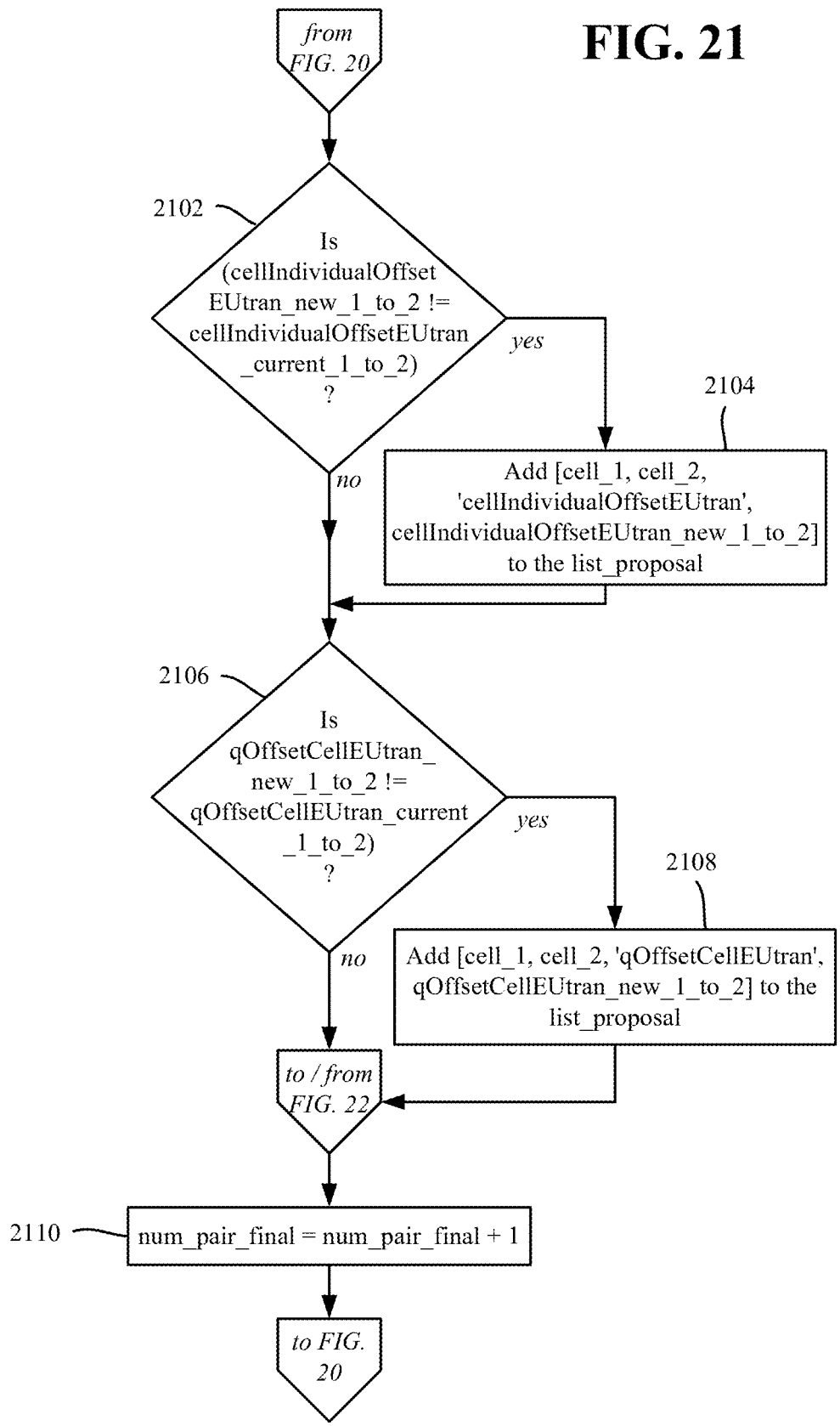

If not skipped. the process continues to operation 2102 of FIG. 21, where the list proposal begins to be built. More particularly, via operation 2102, if (cellIndividualOffsetEUtran_new_1_to_2 does not equal cellIndividualOffsetEUtran_current_1_to_2), [cell_1, cell_2, 'cellIndividualOffsetEUtran', cellIndividualOffsetEUtran_new_1_to_2] is added to the list_proposal. Via operation 2104, if (qOffsetCellEUtran_new_1_to_2 does not equal qOffsetCellEUtran_current_1_to_2), [cell_1, cell_2, 'qOffsetCellEUtran', qOffsetCellEUtran_new_1_to_2] is added to the list_proposal.

Figure 22:
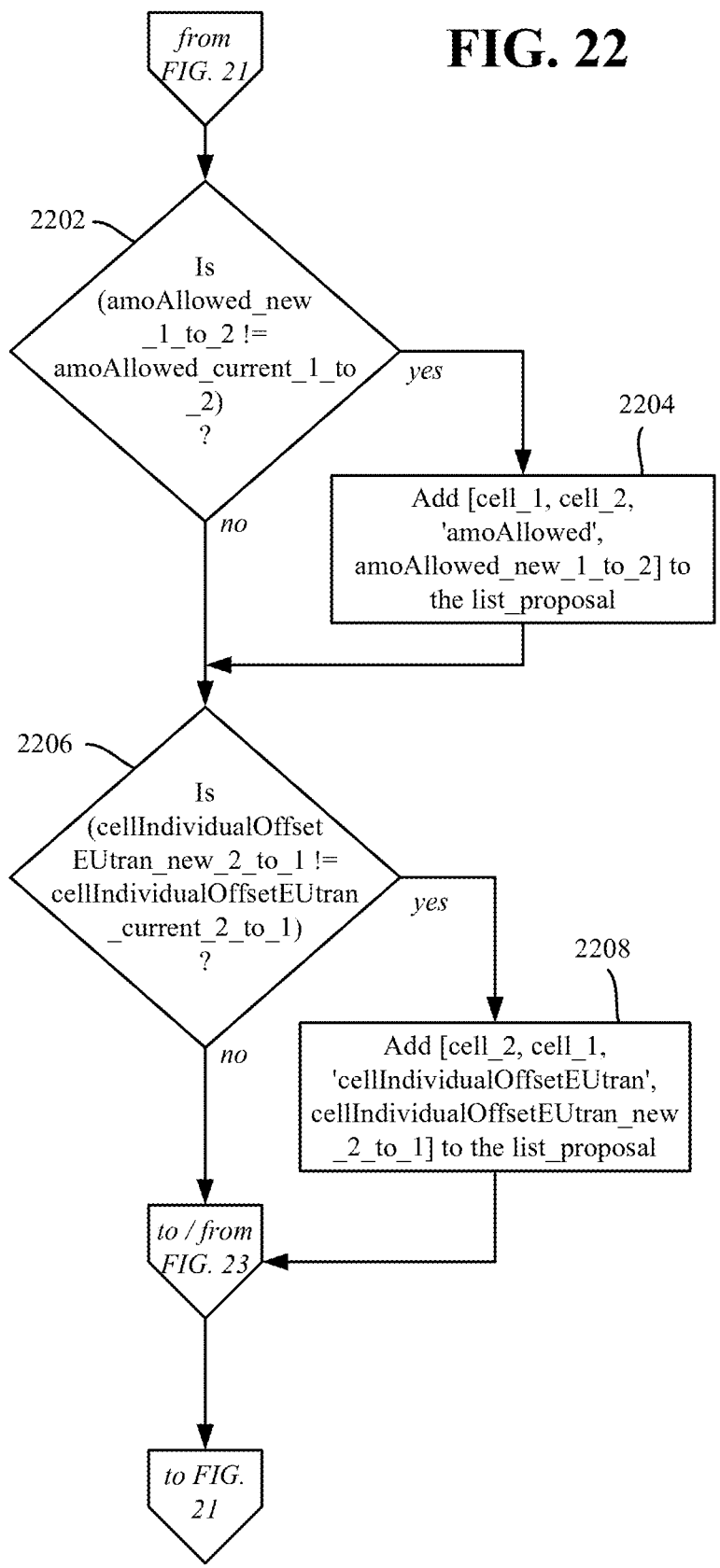

Via FIG. 22, operation 2202, if (amoAllowed_new_1_to_2 does not equal amoAllowed_current_1_to_2), [cell_1, cell_2, 'amoAllowed', amoAllowed_new_1_to_2] is added to the list_proposal. Via operation 2204, if (cellIndividualOffsetEUtran_new_2_to_1 does not equal cellIndividualOffsetEUtran_current_2_to_1), [cell_2, cell_1, 'cellIndividualOffsetEUtran', cellIndividualOffsetEUtran_new_2_to_1] is added to the list_proposal.

Figure 23:
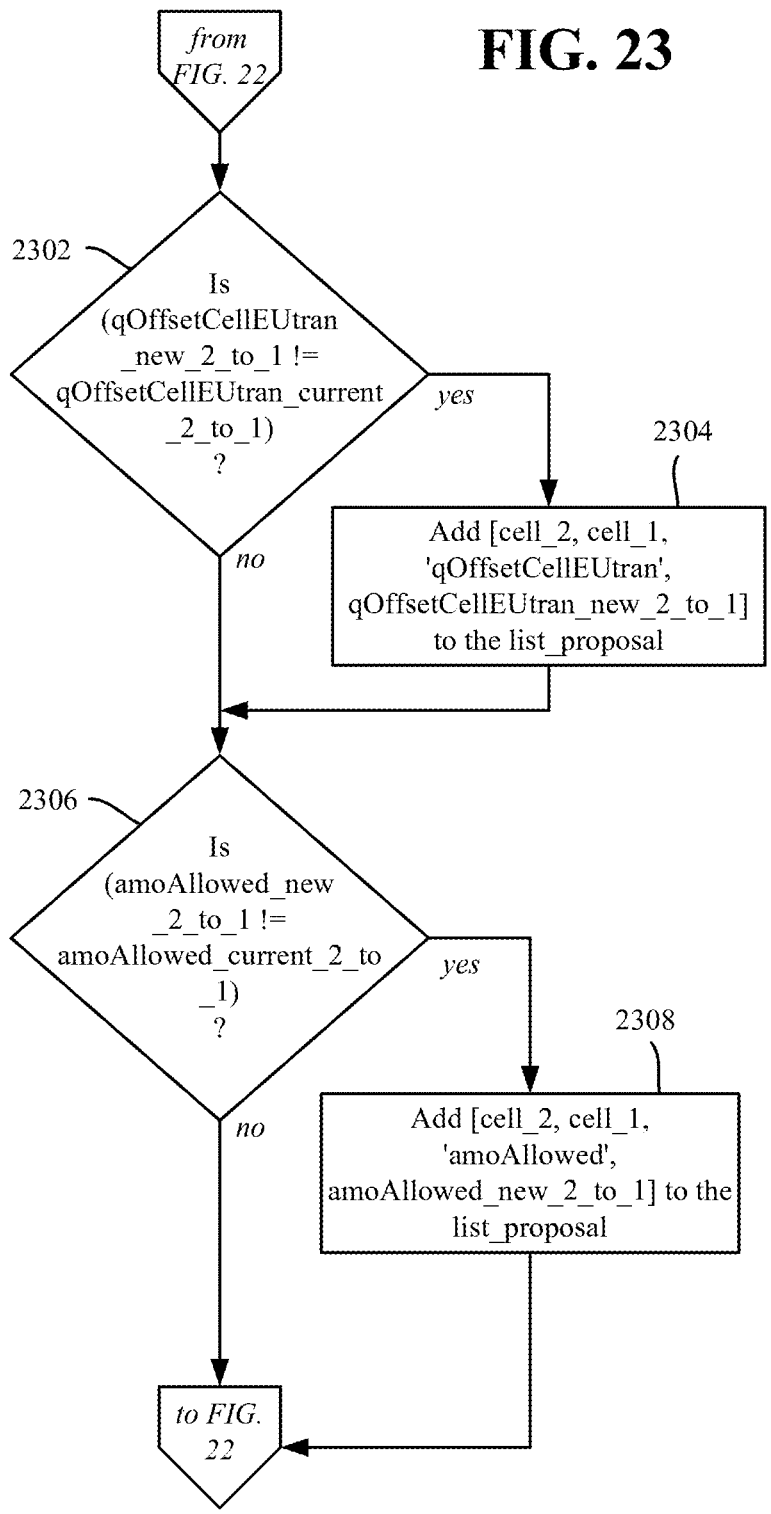

Via FIG. 23, operation 2302, if (qOffsetCellEUtran_new_2_to_1 does not equal qOffsetCellEUtran_current_2_to_1), [cell_2, cell_1, 'qOffsetCellEUtran', qOffsetCellEUtran_new_2_to_1] is added to the list_proposal. Via operation 2304, if (amoAllowed_new_2_to_1 does not equal amoAllowed_current_2_to_1), [cell_2, cell_1, 'amoAllowed', amoAllowed_new_2_to_1] is added to the list_proposal. Once a pair is added to the list proposal, operation 2110 increases the count that corresponds to how many pairs are in the list proposal; (the count is evaluated at operation 1908 of FIG. 19 as described previously.

Following the operations of FIGS. 20-23, the process returns to operation 1912, which along with operation 1914 repeats this part of the process until no pairs remain as detected via operation 1912, or the limit is reached as detected via operation 1908. At this time, the list proposal is returned at operation 1916, which returns to operation 320 of FIG. 3. At operation 320, the proposals are published to the message router 242 as described above with reference to FIG. 2.

Figure 24:
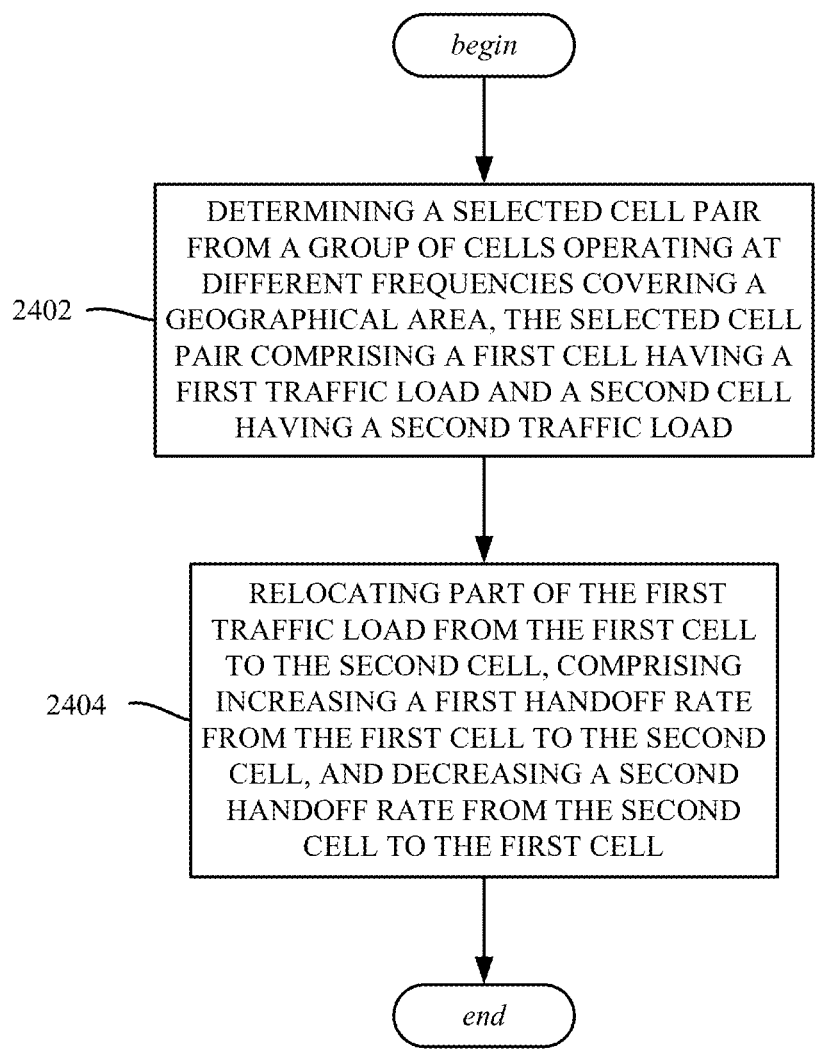
FIG. 24 is a flow diagram representing example operations for changing load volumes between a pair of cells, in accordance with various aspects and embodiments of the subject disclosure.

One or more example aspects are represented in FIG. 24, and can correspond to a system, comprising a processor, and a memory that stores executable instructions that, when executed by the processor of the system, facilitate performance of operations. Example operation 2402 represents determining a selected cell pair from a group of cells operating at different frequencies covering a geographical area, the selected cell pair comprising a first cell having a first traffic load and a second cell having a second traffic load. Example operation 2404 represents relocating part of the first traffic load from the first cell to the second cell, comprising increasing a first handoff rate from the first cell to the second cell, and decreasing a second handoff rate from the second cell to the first cell.

Determining the selected cell pair can comprise estimating that relocating the part of the first traffic load from the first cell to the second cell satisfies a pair level threshold harmonic mean user equipment throughput improvement criterion.

Estimating that the relocating of the part of the first traffic load from the first cell to the second cell satisfies the pair level threshold harmonic mean user equipment throughput improvement criterion can comprise determining a volume load distribution value between the first cell and the second cell, determining an estimated pair level throughput improvement value based on the volume load distribution, and evaluating the estimated pair level throughput improvement value with respect to the pair level threshold harmonic mean user equipment throughput improvement criterion.

Determining the selected cell pair can comprise estimating that the relocating of the part of the first traffic load from the first cell to the second cell satisfies a face level harmonic mean user equipment throughput gain criterion.

Determining the selected cell pair can comprise estimating that the relocating of the part of the first traffic load from the first cell to the second cell satisfies a face level harmonic mean user equipment throughput percentage criterion.

Determining the selected cell pair can comprise obtaining candidate cell pairs, estimating respective harmonic mean user equipment throughput improvement values for respective candidate cell pairs, associating respective harmonic mean user equipment throughput improvement values with the respective candidate cell pairs, and selecting the selected cell pair based on having a greatest harmonic mean user equipment throughput improvement value associated with the selected cell pair relative harmonic mean user equipment throughput improvement values of other candidate cell pairs. The respective harmonic mean user equipment throughput improvement values for the respective candidate cell pairs can comprise respective face level harmonic mean user equipment throughput gain rates.

Determining the selected cell pair can comprise determining that the group of cells satisfies a group eligibility condition.

Determining the selected cell pair can comprise determining that the first cell and the second cell satisfies an eligibility criterion.

The selected cell pair can be a first cell pair, and further operations can comprise determining a second cell pair from the group of cells, the second cell pair comprising a third cell having a third traffic load and a fourth cell having a fourth traffic load, and relocating part of the third traffic load from the third cell to the fourth cell, which can comprise at least one of: increasing a third handoff rate from the third cell to the fourth cell, or decreasing a fourth handoff rate from the fourth cell to the third cell.

The geographical area can comprise a portion of a site, and the group of cells can comprise cells that share a combination of a unique site identifier and a face corresponding to the geographical area.

Figure 25:
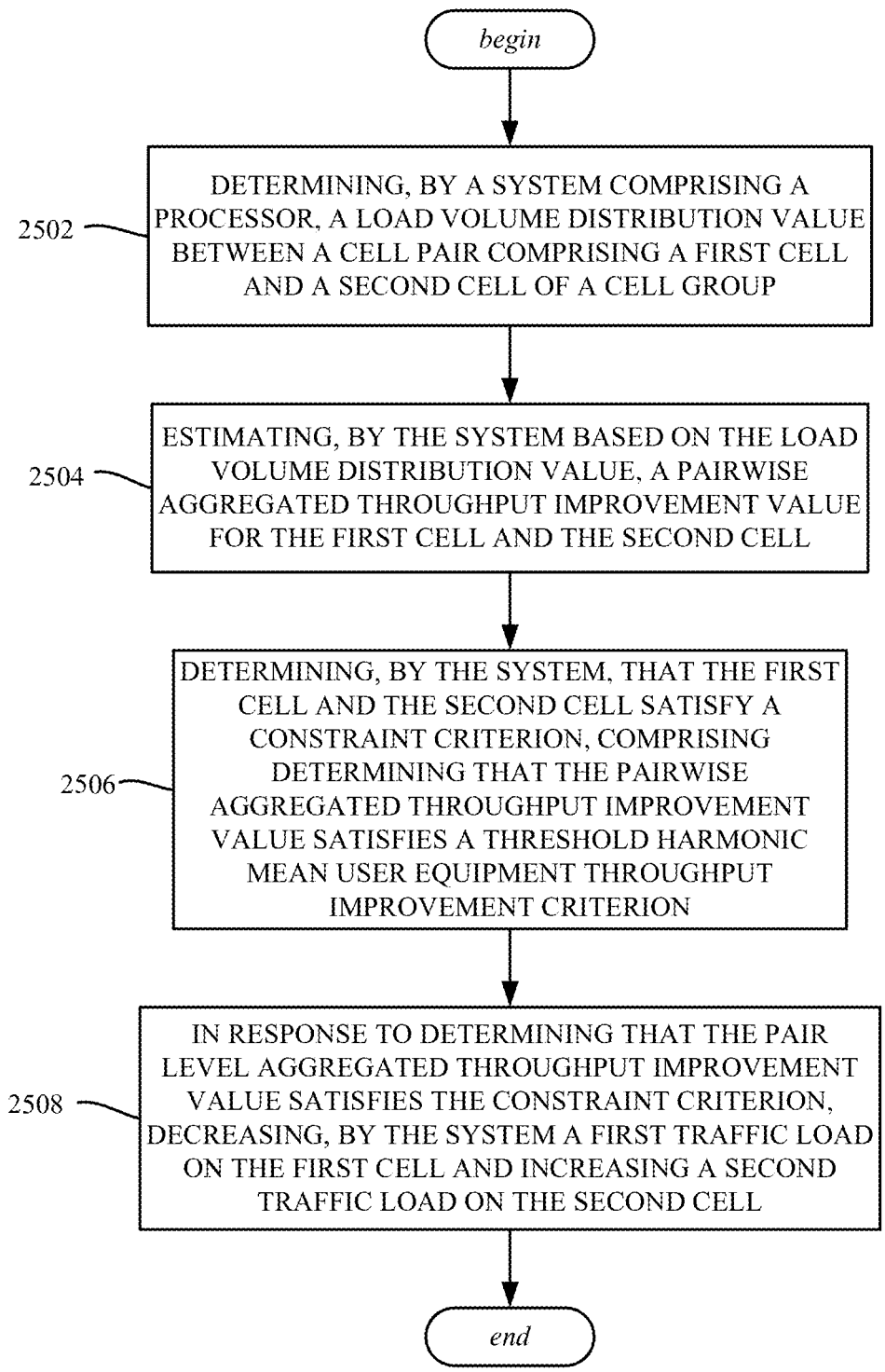
FIG. 25 is a flow diagram representing example operations for relocating traffic between a cell pair based on estimating respective throughput improvement values, in accordance with various aspects and embodiments of the subject disclosure.

One or more example aspects are represented in FIG. 25, and can correspond to example operations of a method. Operation 2502 represents determining, by a system comprising a processor, a load volume distribution value between a cell pair comprising a first cell and a second cell of a cell group; Operation 2504 represents estimating, by the system based on the load volume distribution value, a pairwise aggregated throughput improvement value for the first cell and the second cell. Operation 2506 represents determining, by the system, that the first cell and the second cell satisfy a constraint criterion, comprising determining that the pairwise aggregated throughput improvement value satisfies a threshold harmonic mean user equipment throughput improvement criterion. Operation 2508 represents, in response to determining that the pair level aggregated throughput improvement value satisfies the constraint criterion, decreasing, by the system a first traffic load on the first cell and increasing a second traffic load on the second cell.

Decreasing the first traffic load on the first cell can comprise increasing a first handoff rate from the first cell to the second cell, and increasing the load on the second cell can comprise decreasing a second handoff rate from the second cell to the first cell.

The constraint criterion can be a first constraint criterion, and aspects can comprise estimating, by the system, a face level harmonic mean user equipment throughput gain rate, associating, by the system, the face level harmonic mean user equipment throughput gain rate with the cell pair, and determining, by the system, that the first cell and the second cell satisfy a second constraint criterion comprising determining that the face level harmonic mean user equipment throughput gain rate associated with the cell pair satisfies a face level harmonic mean user equipment throughput rate criterion.

Aspects can comprise determining, by the system, that the first cell and the second cell satisfy a candidate cell pair eligibility criterion, including the first cell and the second cell as candidate cells in response to the determining that the first cell and the second cell satisfy candidate cell pair eligibility criterion, and selecting, by the system, the first cell and the second cell as a selected cell pair from the candidate cells based on the face level harmonic mean user equipment throughput gain rate.

The constraint criterion can be a first constraint criterion, and aspects can comprise estimating, by the system, a face level harmonic mean user equipment throughput percentage, and determining, by the system, that the first cell and the second cell satisfy a second constraint criterion comprising determining that the face level harmonic mean user equipment throughput percentage satisfies a face level harmonic mean user equipment throughput percentage criterion.

Figure 26:
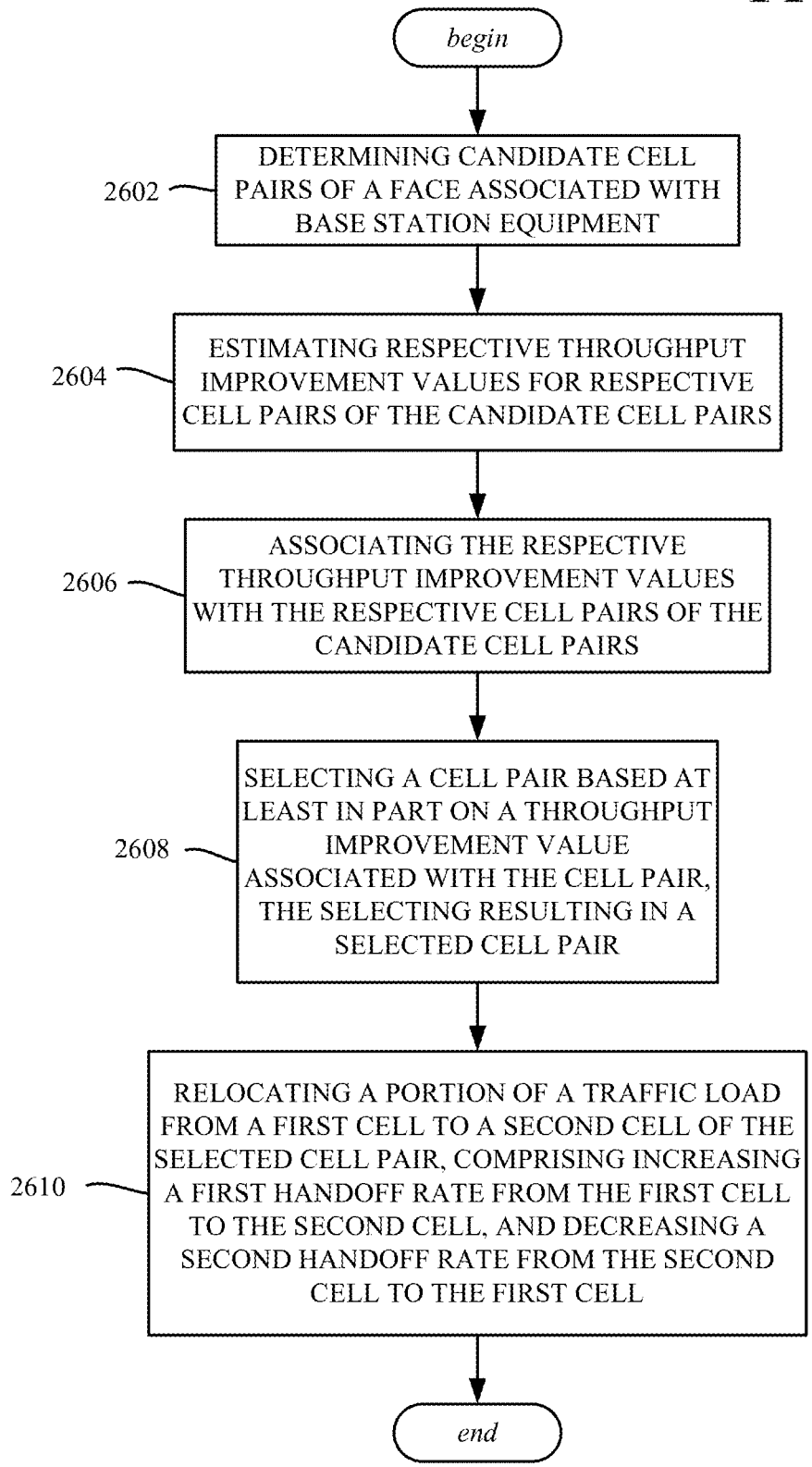
FIG. 26 is a flow diagram representing example operations for relocating traffic load between cells by changing handoff rates between the cells, in accordance with various aspects and embodiments of the subject disclosure.

One or more aspects are represented in FIG. 26, such as implemented in a machine-readable medium, comprising executable instructions that, when executed by a processor, facilitate performance of operations. Example operation 2602 represents determining candidate ell pairs of a face associated with base station equipment. Example operation 2604 represents estimating respective throughput improvement values for respective cell pairs of the candidate cell pairs. Example operation 2606 represents associating the respective throughput improvement values with the respective cell pairs of the candidate cell pairs. Example operation 2608 represents selecting a cell pair based at least in part on a throughput improvement value associated with the cell pair, the selecting resulting in a selected cell pair. Example operation 2610 represents relocating a portion of a traffic load from a first cell to a second cell of the selected cell pair, comprising increasing a first handoff rate from the first cell to the second cell, and decreasing a second handoff rate from the second cell to the first cell.

The selected cell pair can be a first selected cell pair, the throughput improvement value associated with the first selected cell pair can be a first throughput improvement value, the portion of the traffic load can be a first traffic load, and further operations can comprise selecting a second selected cell pair based at least in part on a second throughput improvement value associated with the second selected cell pair, the second selected cell pair comprising a third cell and a fourth cell, and relocating a second portion of a second traffic load from the third cell to a fourth cell of the selected cell pair, comprising at least one of: increasing a third handoff rate from the third cell to the fourth cell, or decreasing a fourth handoff rate from the fourth cell to the second cell.

Estimating the respective throughput improvement values for the respective cell pairs of the candidate cell pairs can comprise determining respective pair-wise throughput improvement gain values for the respective cell pairs, and estimating respective face-wise throughput improvement gain values for the respective cell pairs, and selecting the selected cell pair based at least in part on the throughput improvement value associated with the selected cell pair can comprise sorting the candidate cell pairs based on the respective face-wise throughput improvement gain values associated with the respective cell pairs.

Determining the candidate cell pairs can comprise evaluating respective performance indicators associated with respective cell pairs of the face to determine whether an evaluated cell pair satisfies a candidate cell pair eligibility criterion, and, in response to determining that the evaluated cell pair satisfies candidate cell pair eligibility criterion, including the evaluated cell pair as a candidate cell pair.

As can be seen, the technology described herein facilitates consistent improvement in harmonic mean UE throughput. The technology is based on 3GPP standards compliant parameters for the control actions, without any dependence on vendor-specific parameters. As such, the technology can be deployed independently of and in conjunction with existing vendor solutions. As such, the technology is conducive to deployment across various markets, which may rely on different vendor products.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FAD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FAD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 27:
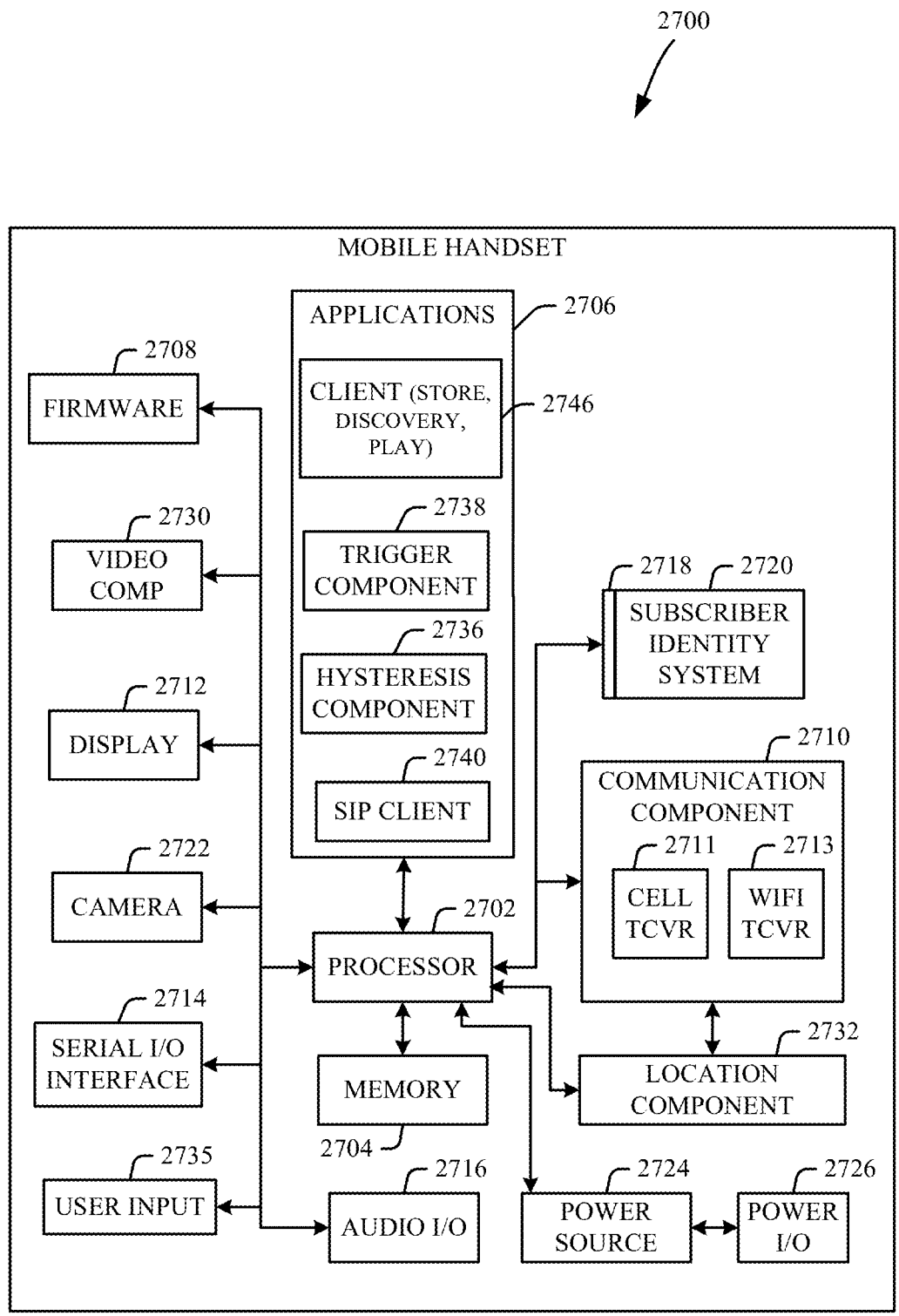
FIG. 27 illustrates an example block diagram of an example mobile handset operable to engage in a system architecture that facilitates wireless communications according to one or more embodiments described herein.

Referring now to FIG. 27, illustrated is a schematic block diagram of an example end-user device (such as user equipment) that can be a mobile device 2700 capable of connecting to a network in accordance with some embodiments described herein. Although a mobile handset 2700 is illustrated herein, it will be understood that other devices can be a mobile device, and that the mobile handset 2700 is merely illustrated to provide context for the embodiments of the various embodiments described herein. The following discussion is intended to provide a brief, general description of an example of a suitable environment 2700 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 2700 includes a processor 2702 for controlling and processing all onboard operations and functions. A memory 2704 interfaces to the processor 2702 for storage of data and one or more applications 2706 (e.g., a video player software, user feedback component software, etc.). Other applications can include voice recognition of predetermined voice commands that facilitate initiation of the user feedback signals. The applications 2706 can be stored in the memory 2704 and/or in a firmware 2708, and executed by the processor 2702 from either or both the memory 2704 or/and the firmware 2708. The firmware 2708 can also store startup code for execution in initializing the handset 2700. A communications component 2710 interfaces to the processor 2702 to facilitate wired/wireless communication with external systems, e.g., cellular networks, VoIP networks, and so on. Here, the communications component 2710 can also include a suitable cellular transceiver 2711 (e.g., a GSM transceiver) and/or an unlicensed transceiver 2713 (e.g., Wi-Fi, WiMax) for corresponding signal communications. The handset 2700 can be a device such as a cellular telephone, a PDA with mobile communications capabilities, and messaging-centric devices. The communications component 2710 also facilitates communications reception from terrestrial radio networks (e.g., broadcast), digital satellite radio networks, and Internet-based radio services networks.

The handset 2700 includes a display 2712 for displaying text, images, video, telephony functions (e.g., a Caller ID function), setup functions, and for user input. For example, the display 2712 can also be referred to as a "screen" that can accommodate the presentation of multimedia content (e.g., music metadata, messages, wallpaper, graphics, etc.). The display 2712 can also display videos and can facilitate the generation, editing and sharing of video quotes. A serial I/O interface 2714 is provided in communication with the processor 2702 to facilitate wired and/or wireless serial communications (e.g., USB, and/or IEEE 2794) through a hardwire connection, and other serial input devices (e.g., a keyboard, keypad, and mouse). This supports updating and troubleshooting the handset 2700, for example. Audio capabilities are provided with an audio I/O component 2716, which can include a speaker for the output of audio signals related to, for example, indication that the user pressed the proper key or key combination to initiate the user feedback signal. The audio I/O component 2716 also facilitates the input of audio signals through a microphone to record data and/or telephony voice data, and for inputting voice signals for telephone conversations.

The handset 2700 can include a slot interface 2718 for accommodating a SIC (Subscriber Identity Component) in the form factor of a card Subscriber Identity Module (SIM) or universal SIM 2720, and interfacing the SIM card 2720 with the processor 2702. However, it is to be appreciated that the SIM card 2720 can be manufactured into the handset 2700, and updated by downloading data and software.

The handset 2700 can process IP data traffic through the communication component 2710 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 2722 (e.g., a camera) can be provided for decoding encoded multimedia content. The video processing component 2722 can aid in facilitating the generation, editing and sharing of video quotes. The handset 2700 also includes a power source 2724 in the form of batteries and/or an AC power subsystem, which power source 2724 can interface to an external power system or charging equipment (not shown) by a power I/O component 2726.

The handset 2700 can also include a video component 2730 for processing video content received and, for recording and transmitting video content. For example, the video component 2730 can facilitate the generation, editing and sharing of video quotes. A location tracking component 2732 facilitates geographically locating the handset 2700. As described hereinabove, this can occur when the user initiates the feedback signal automatically or manually. A user input component 2734 facilitates the user initiating the quality feedback signal. The user input component 2734 can also facilitate the generation, editing and sharing of video quotes. The user input component 2734 can include such conventional input device technologies such as a keypad, keyboard, mouse, stylus pen, and/or touch screen, for example.

Referring again to the applications 2706, a hysteresis component 2736 facilitates the analysis and processing of hysteresis data, which is utilized to determine when to associate with the access point. A software trigger component 2738 can be provided that facilitates triggering of the hysteresis component 2738 when the Wi-Fi transceiver 2713 detects the beacon of the access point. A SIP client 2740 enables the handset 2700 to support SIP protocols and register the subscriber with the SIP registrar server. The applications 2706 can also include a client 2742 that provides at least the capability of discovery, play and store of multimedia content, for example, music.

The handset 2700, as indicated above related to the communications component 810, includes an indoor network radio transceiver 2713 (e.g., Wi-Fi transceiver). This function supports the indoor radio link, such as IEEE 802.11, for the dual-mode GSM handset 2700. The handset 2700 can accommodate at least satellite radio services through a handset that can combine wireless voice and digital radio chipsets into a single handheld device.

Figure 28:
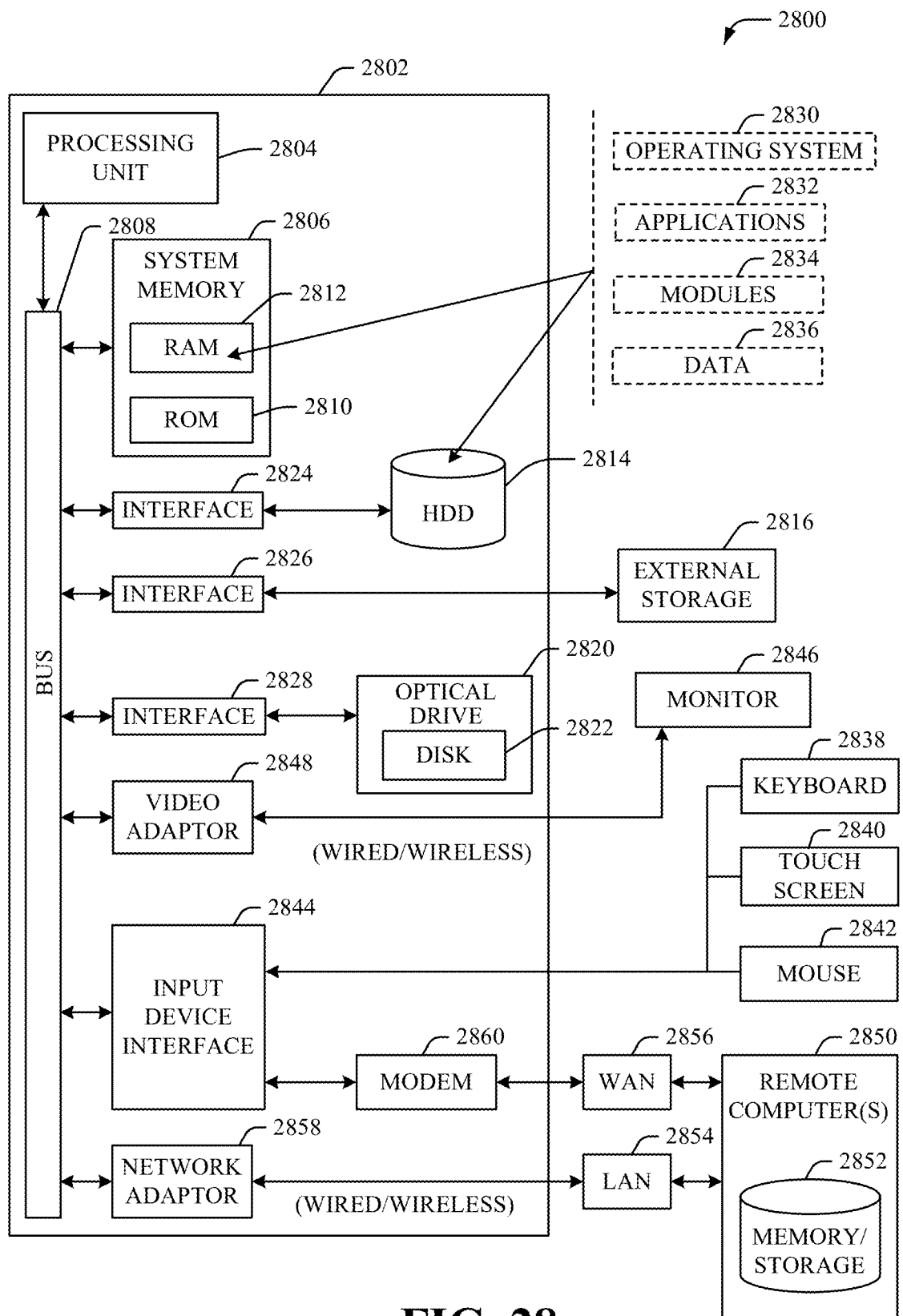
FIG. 28 illustrates an example block diagram of an example computer/machine system operable to engage in a system architecture that facilitates wireless communications according to one or more embodiments described herein.

In order to provide additional context for various embodiments described herein, FIG. 28 and the following discussion are intended to provide a brief, general description of a suitable computing environment 2800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 28, the example environment 2800 for implementing various embodiments of the aspects described herein includes a computer 2802, the computer 2802 including a processing unit 2804, a system memory 2806 and a system bus 2808. The system bus 2808 couples system components including, but not limited to, the system memory 2806 to the processing unit 2804. The processing unit 2804 can be any of various commercially available processors. Dual microprocessors and other multi-processor architectures can also be employed as the processing unit 2804.

The system bus 2808 can be any of several types of bus structure that can further interconnect to a memory bus (with or without a memory controller), a peripheral bus, and a local bus using any of a variety of commercially available bus architectures. The system memory 2806 includes ROM 2810 and RAM 2812. A basic input/output system (BIOS) can be stored in a non-volatile memory such as ROM, erasable programmable read only memory (EPROM), EEPROM, which BIOS contains the basic routines that help to transfer information between elements within the computer 2802, such as during startup. The RAM 2812 can also include a high-speed RAM such as static RAM for caching data.

The computer 2802 further includes an internal hard disk drive (HDD) 2814 (e.g., EIDE, SATA), one or more external storage devices 2816 (e.g., a magnetic floppy disk drive (FAD) 2816, a memory stick or flash drive reader, a memory card reader, etc.) and an optical disk drive 2820 (e.g., which can read or write from a CD-ROM disc, a DVD, a BD, etc.). While the internal HDD 2814 is illustrated as located within the computer 2802, the internal HDD 2814 can also be configured for external use in a suitable chassis (not shown). Additionally, while not shown in environment 2800, a solid state drive (SSD), non-volatile memory and other storage technology could be used in addition to, or in place of, an HDD 2814, and can be internal or external. The HDD 2814, external storage device(s) 2816 and optical disk drive 2820 can be connected to the system bus 2808 by an HDD interface 2824, an external storage interface 2826 and an optical drive interface 2828, respectively. The interface 2824 for external drive implementations can include at least one or both of Universal Serial Bus (USB) and Institute of Electrical and Electronics Engineers (IEEE) 2794 interface technologies. Other external drive connection technologies are within contemplation of the embodiments described herein.

The drives and their associated computer-readable storage media provide nonvolatile storage of data, data structures, computer-executable instructions, and so forth. For the computer 2802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2812, including an operating system 2830, one or more application programs 2832, other program modules 2834 and program data 2836. All or portions of the operating system, applications, modules, and/or data can also be cached in the RAM 2812. The systems and methods described herein can be implemented utilizing various commercially available operating systems or combinations of operating systems.

Computer 2802 can optionally include emulation technologies. For example, a hypervisor (not shown) or other intermediary can emulate a hardware environment for operating system 2830, and the emulated hardware can optionally be different from the hardware illustrated in FIG. 28. In such an embodiment, operating system 2830 can include one virtual machine (VM) of multiple VMs hosted at computer 2802. Furthermore, operating system 2830 can provide runtime environments, such as the Java runtime environment or the .NET framework, for applications 2832. Runtime environments are consistent execution environments that allow applications 2832 to run on any operating system that includes the runtime environment. Similarly, operating system 2830 can support containers, and applications 2832 can be in the form of containers, which are lightweight, standalone, executable packages of software that include, e.g., code, runtime, system tools, system libraries and settings for an application.

Further, computer 2802 can be enabled with a security module, such as a trusted processing module (TPM). For instance with a TPM, boot components hash next in time boot components, and wait for a match of results to secured values, before loading a next boot component. This process can take place at any layer in the code execution stack of computer 2802, e.g., applied at the application execution level or at the operating system (OS) kernel level, thereby enabling security at any level of code execution.

A user can enter commands and information into the computer 2802 through one or more wired/wireless input devices, e.g., a keyboard 2838, a touch screen 2840, and a pointing device, such as a mouse 2842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2804 through an input device interface 2844 that can be coupled to the system bus 2808, but can be connected by other interfaces, such as a parallel port, an IEEE 2794 serial port, a game port, a USB port, an IR interface, a BLUETOOTH® interface, etc.

A monitor 2846 or other type of display device can be also connected to the system bus 2808 via an interface, such as a video adapter 2848. In addition to the monitor 2846, a computer typically includes other peripheral output devices (not shown), such as speakers, printers, etc.

The computer 2802 can operate in a networked environment using logical connections via wired and/or wireless communications to one or more remote computers, such as a remote computer(s) 2850. The remote computer(s) 2850 can be a workstation, a server computer, a router, a personal computer, portable computer, microprocessor-based entertainment appliance, a peer device or other common network node, and typically includes many or all of the elements described relative to the computer 2802, although, for purposes of brevity, only a memory/storage device 2852 is illustrated. The logical connections depicted include wired/wireless connectivity to a local area network (LAN) 2854 and/or larger networks, e.g., a wide area network (WAN) 2856. Such LAN and WAN networking environments are commonplace in offices and companies, and facilitate enterprise-wide computer networks, such as intranets, all of which can connect to a global communications network, e.g., the Internet.

When used in a LAN networking environment, the computer 2802 can be connected to the local network 2854 through a wired and/or wireless communication network interface or adapter 2858. The adapter 2858 can facilitate wired or wireless communication to the LAN 2854, which can also include a wireless access point (AP) disposed thereon for communicating with the adapter 2858 in a wireless mode.

When used in a WAN networking environment, the computer 2802 can include a modem 2860 or can be connected to a communications server on the WAN 2856 via other means for establishing communications over the WAN 2856, such as by way of the Internet. The modem 2860, which can be internal or external and a wired or wireless device, can be connected to the system bus 2808 via the input device interface 2844. In a networked environment, program modules depicted relative to the computer 2802 or portions thereof, can be stored in the remote memory/storage device 2852. It will be appreciated that the network connections shown are example and other means of establishing a communications link between the computers can be used.

When used in either a LAN or WAN networking environment, the computer 2802 can access cloud storage systems or other network-based storage systems in addition to, or in place of, external storage devices 2816 as described above. Generally, a connection between the computer 2802 and a cloud storage system can be established over a LAN 2854 or WAN 2856 e.g., by the adapter 2858 or modem 2860, respectively. Upon connecting the computer 2802 to an associated cloud storage system, the external storage interface 2826 can, with the aid of the adapter 2858 and/or modem 2860, manage storage provided by the cloud storage system as it would other types of external storage. For instance, the external storage interface 2826 can be configured to provide access to cloud storage sources as if those sources were physically connected to the computer 2802.

The computer 2802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 28 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor, facilitate performance of operations, the operations comprising:
      determining a selected cell pair from a group of cells operating at different frequencies covering a geographical area, the selected cell pair comprising a first cell having a first traffic load and a second cell having a second traffic load; and
      relocating part of the first traffic load from the first cell to the second cell, comprising increasing a first handoff rate from the first cell to the second cell, and decreasing a second handoff rate from the second cell to the first cell.

2. The system of claim 1, wherein determining the selected cell pair comprises estimating that relocating the part of the first traffic load from the first cell to the second cell satisfies a pair level threshold harmonic mean user equipment throughput improvement criterion.

3. The system of claim 2, wherein estimating that the relocating of the part of the first traffic load from the first cell to the second cell satisfies the pair level threshold harmonic mean user equipment throughput improvement criterion comprises determining a volume load distribution value between the first cell and the second cell, determining an estimated pair level throughput improvement value based on the volume load distribution, and evaluating the estimated pair level throughput improvement value with respect to the pair level threshold harmonic mean user equipment throughput improvement criterion.

4. The system of claim 1, wherein determining the selected cell pair comprises estimating that the relocating of the part of the first traffic load from the first cell to the second cell satisfies a face level harmonic mean user equipment throughput gain criterion.

5. The system of claim 1, wherein determining the selected cell pair comprises estimating that the relocating of the part of the first traffic load from the first cell to the second cell satisfies a face level harmonic mean user equipment throughput gain percentage criterion.

6. The system of claim 1, wherein determining the selected cell pair comprises obtaining candidate cell pairs, estimating respective harmonic mean user equipment throughput improvement values for respective candidate cell pairs, associating respective harmonic mean user equipment throughput improvement values with the respective candidate cell pairs, and selecting the selected cell pair based on having a greatest harmonic mean user equipment throughput improvement value associated with the selected cell pair relative harmonic mean user equipment throughput improvement values of other candidate cell pairs.

7. The system of claim 6, wherein the respective harmonic mean user equipment throughput improvement values for the respective candidate cell pairs comprise respective face level harmonic mean user equipment throughput gain rates.

8. The system of claim 1, wherein determining the selected cell pair comprises determining that the group of cells satisfies a group eligibility condition.

9. The system of claim 1, wherein determining the selected cell pair comprises determining that the first cell and the second cell satisfies an eligibility criterion.

10. The system of claim 1, wherein the selected cell pair is a first cell pair, and wherein the operations further comprise determining a second cell pair from the group of cells, the second cell pair comprising a third cell having a third traffic load and a fourth cell having a fourth traffic load, and relocating part of the third traffic load from the third cell to the fourth cell, comprising increasing a third handoff rate from the third cell to the fourth cell, and decreasing a fourth handoff rate from the fourth cell to the third cell.

11. The system of claim 1, wherein the geographical area comprises a portion of a site, and wherein the group of cells comprises cells that share a combination of a unique site identifier and a face corresponding to the geographical area.

12. A method, comprising:
    determining, by a system comprising a processor, a load volume distribution value between a cell pair comprising a first cell and a second cell of a cell group;
    estimating, by the system based on the load volume distribution value, a pairwise aggregated throughput improvement value for the first cell and the second cell;
    determining, by the system, that the first cell and the second cell satisfy a constraint criterion, comprising determining that the pairwise aggregated throughput improvement value satisfies a threshold harmonic mean user equipment throughput improvement criterion; and
    in response to determining that the pair level aggregated throughput improvement value satisfies the constraint criterion, decreasing, by the system a first traffic load on the first cell and increasing a second traffic load on the second cell.

13. The method of claim 12, wherein decreasing the first traffic load on the first cell comprises increasing a first handoff rate from the first cell to the second cell, or wherein increasing the load on the second cell comprises decreasing a second handoff rate from the second cell to the first cell, or wherein decreasing the first traffic load on the first cell comprises both increasing a first handoff rate from the first cell to the second cell and decreasing a second handoff rate from the second cell to the first cell.

14. The method of claim 12, wherein the constraint criterion is a first constraint criterion, and further comprising estimating, by the system, a face level harmonic mean user equipment throughput gain rate, associating, by the system, the face level harmonic mean user equipment throughput gain rate with the cell pair, and determining, by the system, that the first cell and the second cell satisfy a second constraint criterion comprising determining that the face level harmonic mean user equipment throughput gain rate associated with the cell pair satisfies a face level harmonic mean user equipment throughput rate criterion.

15. The method of claim 14, further comprising determining, by the system, that the first cell and the second cell satisfy a candidate cell pair eligibility criterion, including the first cell and the second cell as candidate cells in response to the determining that the first cell and the second cell satisfy candidate cell pair eligibility criterion, and selecting, by the system, the first cell and the second cell as a selected cell pair from the candidate cells based on the face level harmonic mean user equipment throughput gain rate.

16. The method of claim 12, wherein the constraint criterion is a first constraint criterion, and further comprising estimating, by the system, a face level harmonic mean user equipment throughput improvement percentage, and determining, by the system, that the first cell and the second cell satisfy a second constraint criterion comprising determining that the face level harmonic mean user equipment throughput improvement percentage satisfies a face level harmonic mean user equipment throughput improvement percentage criterion.

17. A non-transitory machine-readable medium, comprising executable instructions that, when executed by a processor, facilitate performance of operations, the operations comprising:
    determining candidate cell pairs of a face associated with base station equipment;
    estimating respective throughput improvement values for respective cell pairs of the candidate cell pairs;
    associating the respective throughput improvement values with the respective cell pairs of the candidate cell pairs;
    selecting a cell pair based at least in part on a throughput improvement value associated with the cell pair, the selecting resulting in a selected cell pair; and
    relocating a portion of a traffic load from a first cell to a second cell of the selected cell pair, comprising increasing a first handoff rate from the first cell to the second cell, and decreasing a second handoff rate from the second cell to the first cell.

18. The non-transitory machine-readable medium of claim 17, wherein the selected cell pair is a first selected cell pair, wherein the throughput improvement value associated with the first selected cell pair is a first throughput improvement value, wherein the portion of the traffic load is a first traffic load, and wherein the operations further comprise selecting a second selected cell pair based at least in part on a second throughput improvement value associated with the second selected cell pair, the second selected cell pair comprising a third cell and a fourth cell, and relocating a second portion of a second traffic load from the third cell to a fourth cell of the selected cell pair, comprising increasing a third handoff rate from the third cell to the fourth cell, and decreasing a fourth handoff rate from the fourth cell to the second cell.

19. The non-transitory machine-readable medium of claim 17, wherein estimating the respective throughput improvement values for the respective cell pairs of the candidate cell pairs comprises determining respective pairwise throughput improvement gain values for the respective cell pairs, and estimating respective face-wise throughput improvement gain values for the respective cell pairs, and wherein the selecting the selected cell pair based at least in part on the throughput improvement value associated with the selected cell pair comprises sorting the candidate cell pairs based on the respective face-wise throughput improvement gain values associated with the respective cell pairs.

20. The non-transitory machine-readable medium of claim 17, wherein determining the candidate cell pairs comprises evaluating respective performance indicators associated with respective cell pairs of the face to determine whether an evaluated cell pair satisfies a candidate cell pair eligibility criterion, and, in response to determining that the evaluated cell pair satisfies candidate cell pair eligibility criterion, including the evaluated cell pair as a candidate cell pair.

* * * * *